(12) United States Patent
Aghili

(10) Patent No.: US 7,688,016 B2
(45) Date of Patent: Mar. 30, 2010

(54) ROBUST IMPEDANCE-MATCHING OF MANIPULATORS INTERACTING WITH UNKNOWN ENVIRONMENTS

(75) Inventor: Farhad Aghili, Brossard (CA)

(73) Assignee: Canadian Space Agency, Saint-Hubert, QC (CA)

( * ) Notice: Subject to any disclaimer, the term of this patent is extended or adjusted under 35 U.S.C. 154(b) by 1218 days.

(21) Appl. No.: 11/236,507

(22) Filed: Sep. 28, 2005

(65) Prior Publication Data

US 2007/0073442 A1    Mar. 29, 2007

(51) Int. Cl.
*B25J 9/18*    (2006.01)
(52) U.S. Cl. ............... 318/568.11; 318/611; 318/632
(58) Field of Classification Search ......... 318/563–565, 318/568.11, 568.21–568.24, 606, 611, 615–623, 318/626, 632; 901/2, 6, 8, 9; 700/245, 247, 700/248
See application file for complete search history.

(56) References Cited

U.S. PATENT DOCUMENTS 5,231,693 A * 7/1993 Backes et al. ............... 700/264
7,403,826 B2 * 7/2008 Aghili et al. .................. 700/28

OTHER PUBLICATIONS

Impedance Control: An Approach to Manipulation, Part I—Theory, Neville Hogan, Dept. of Mechanical Engineering, Mar. 1985, vol. 107, pp. 1-7.
Impedance Control: An Approach to Manipulation, Part II—Implementation, Neville Hogan, Dept. of Mechanical Engineering, Mar. 1985, vol. 107, pp. 8-16.

* cited by examiner

*Primary Examiner*—Bentsu Ro
(74) *Attorney, Agent, or Firm*—Marks & Clerk; Richard J. Mitchell

(57) ABSTRACT

A system for replicating the behavior of a target robotic manipulator with respect to a payload and worksite, has a real-time simulator capturing the dynamics of the target robot manipulator; a mock-up of the payload and worksite; and an emulating robotic manipulator for interacting with said payload and worksite. The emulating robotic manipulator is controlled by the real-time simulator in a control loop to replicate the dynamical behavior of said target robotic manipulator in its environment by matching the impedance of the emulating robotic manipulator with that of the target robotic manipulator.

26 Claims, 17 Drawing Sheets

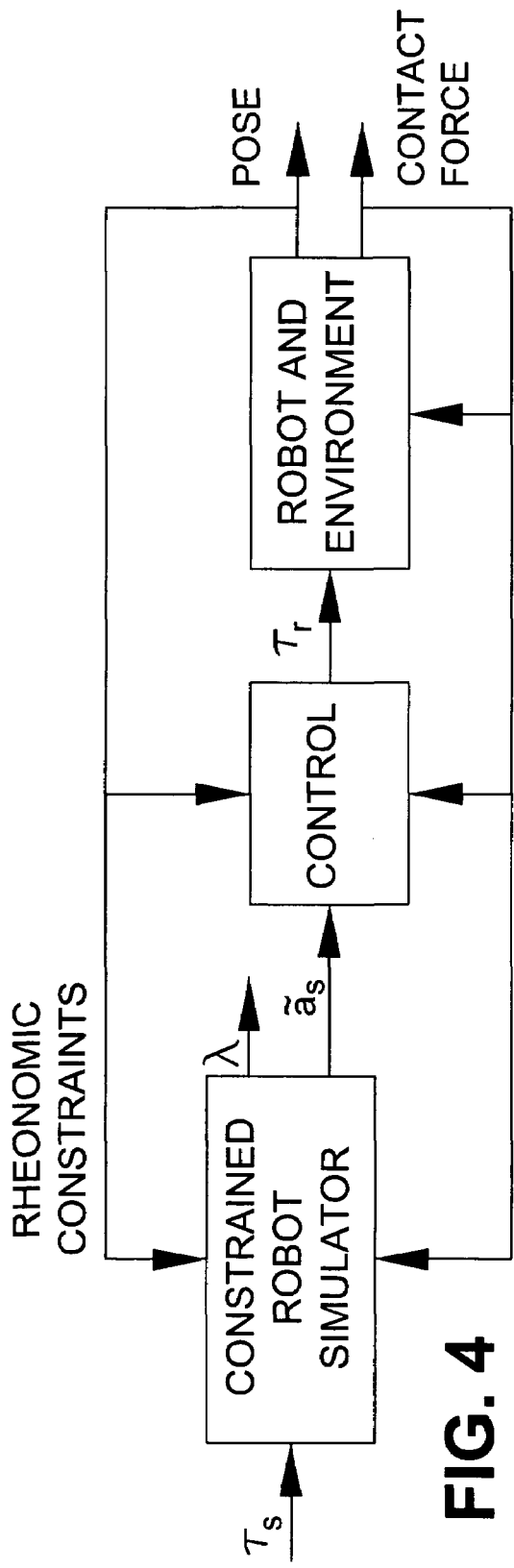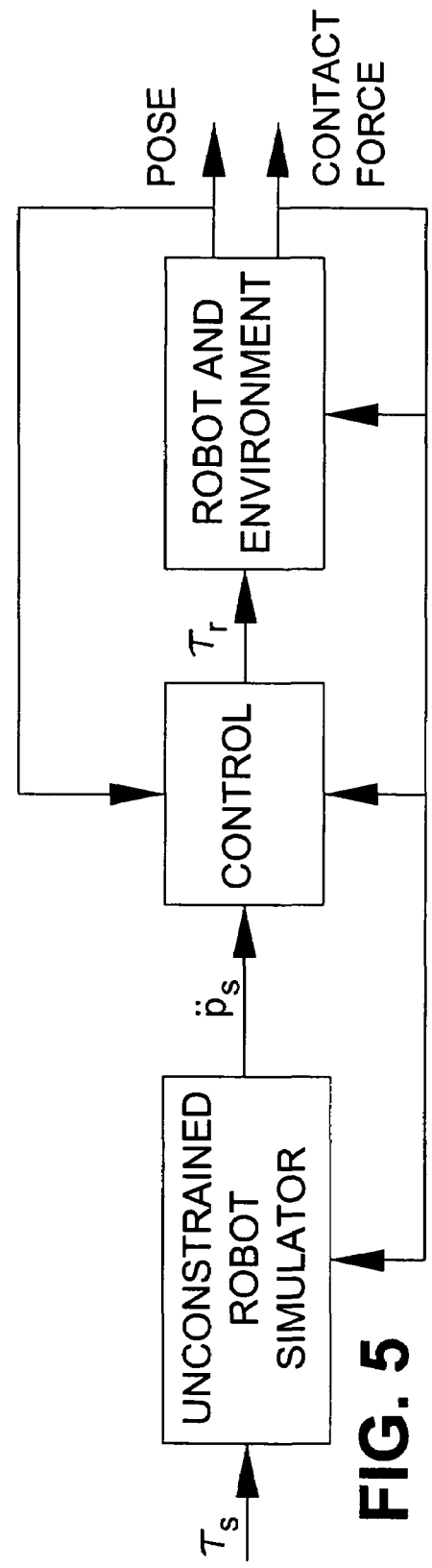

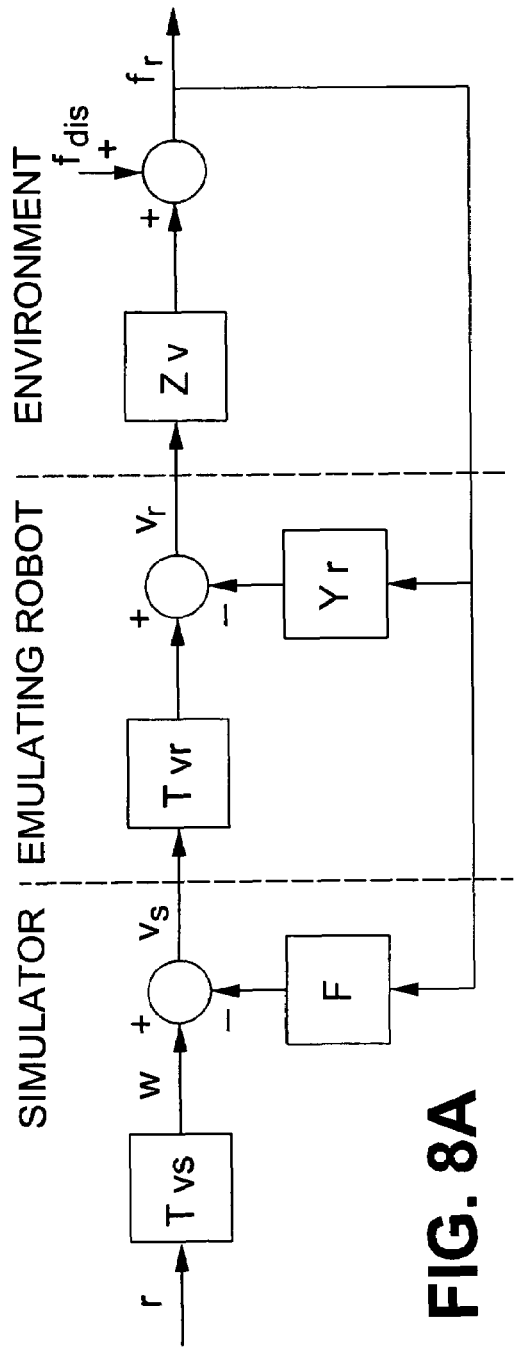
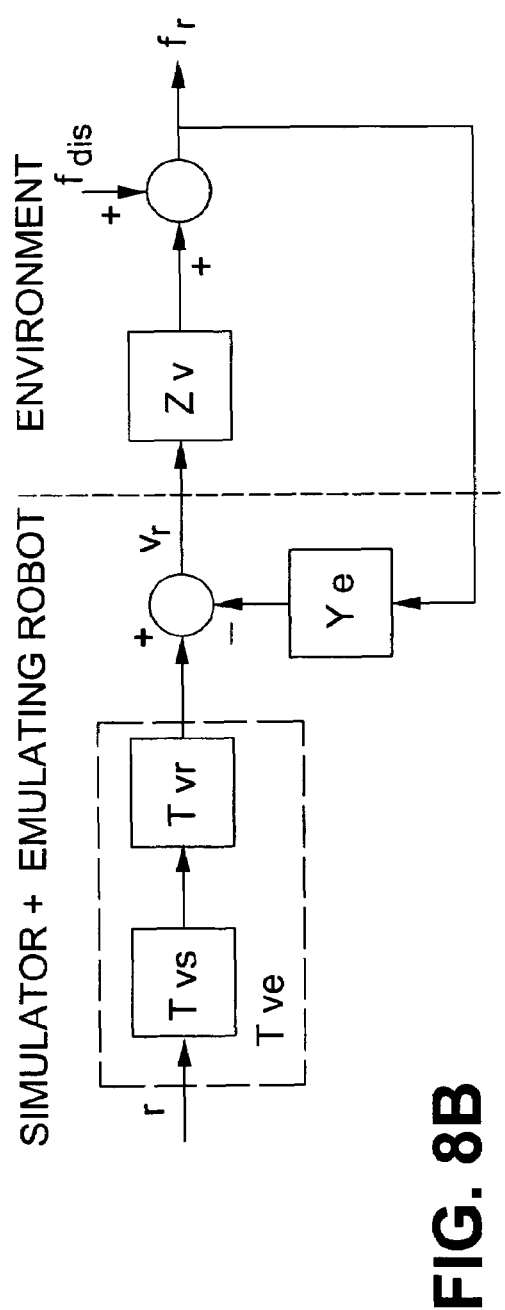
FIG. 8A
FIG. 8B

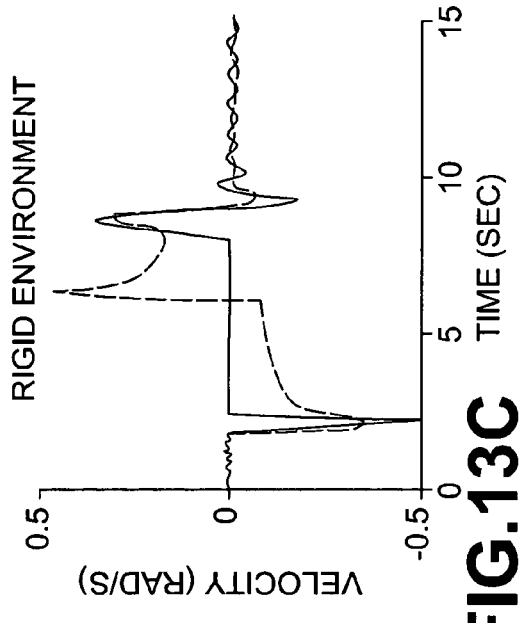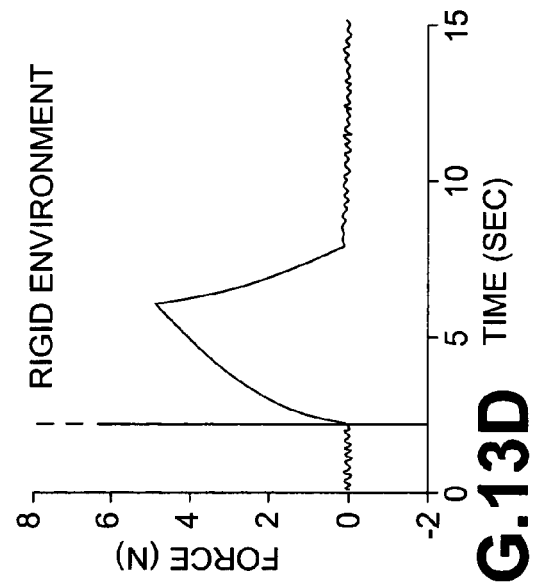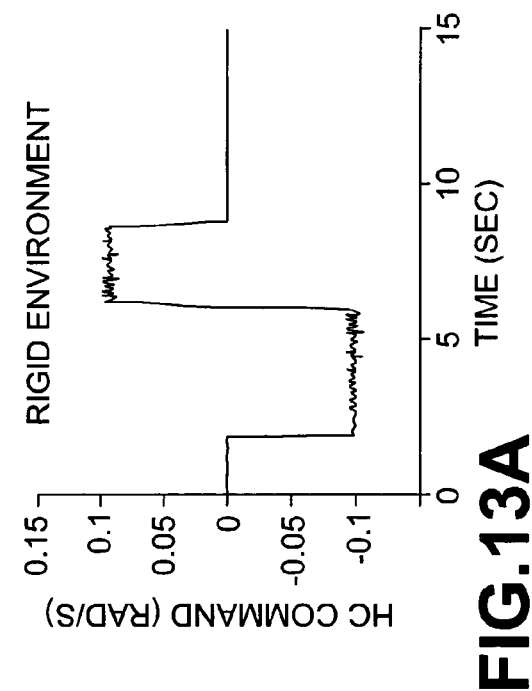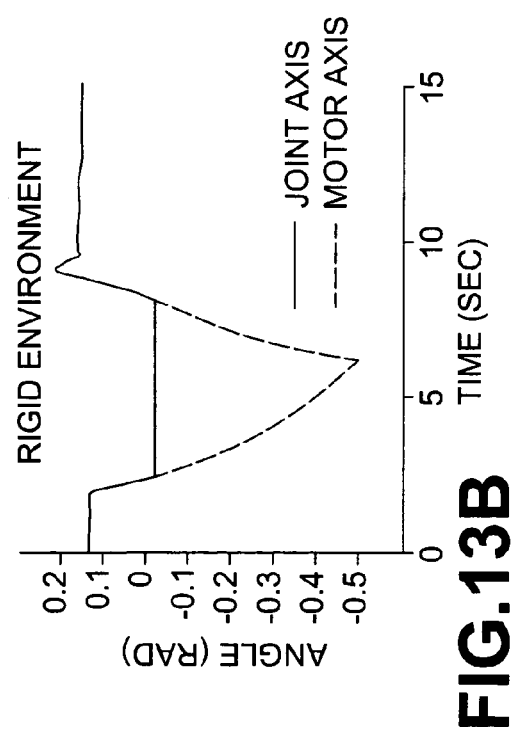

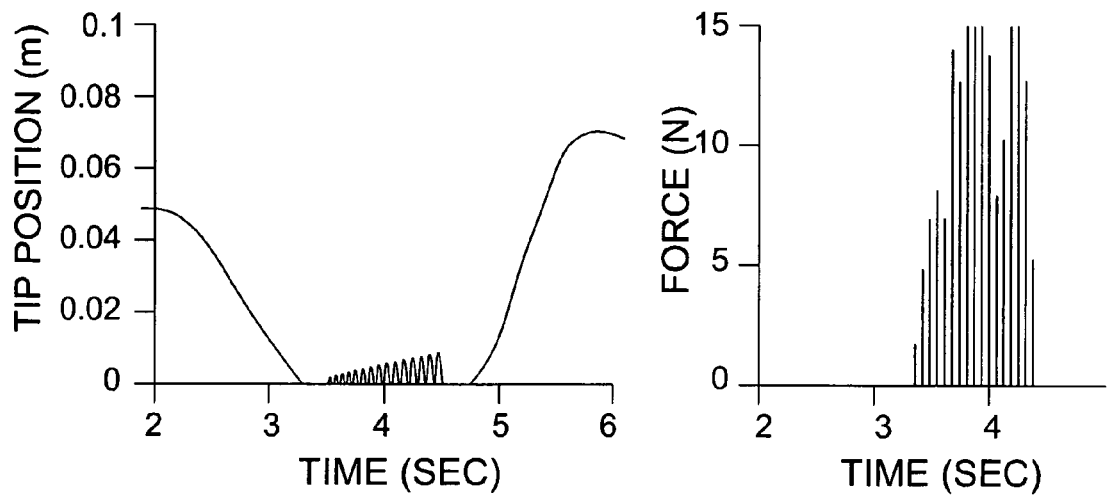
FIG. 16A  FIG. 16B
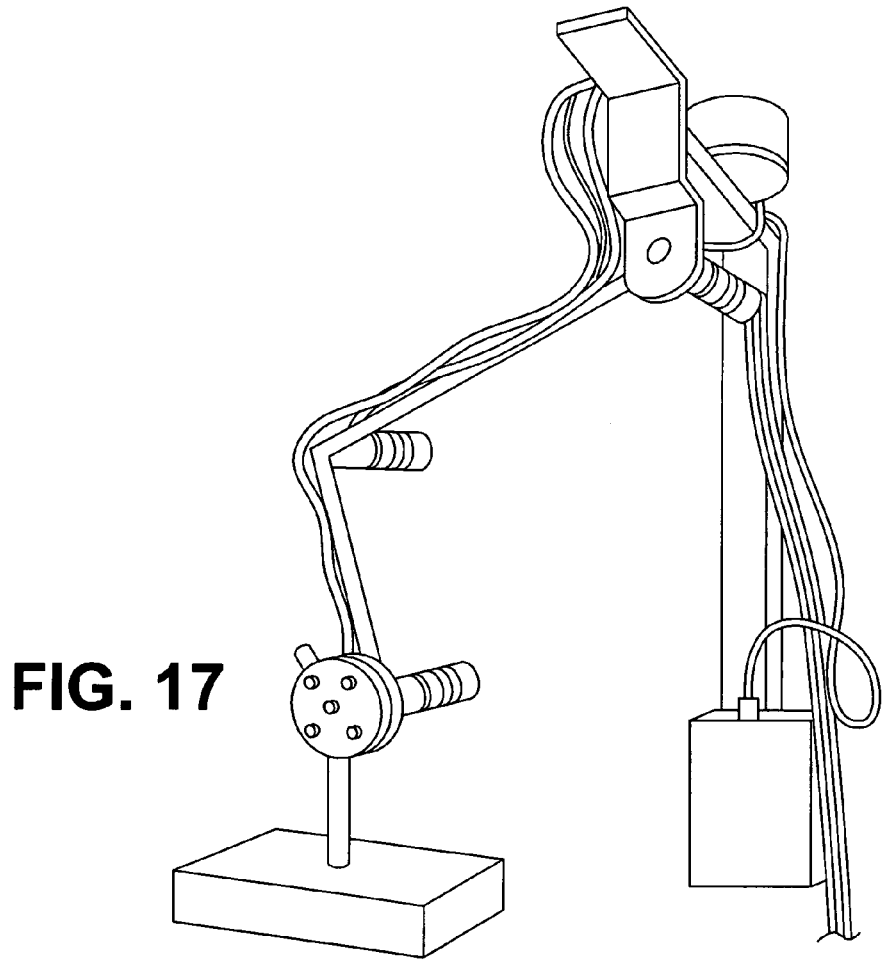
FIG. 17

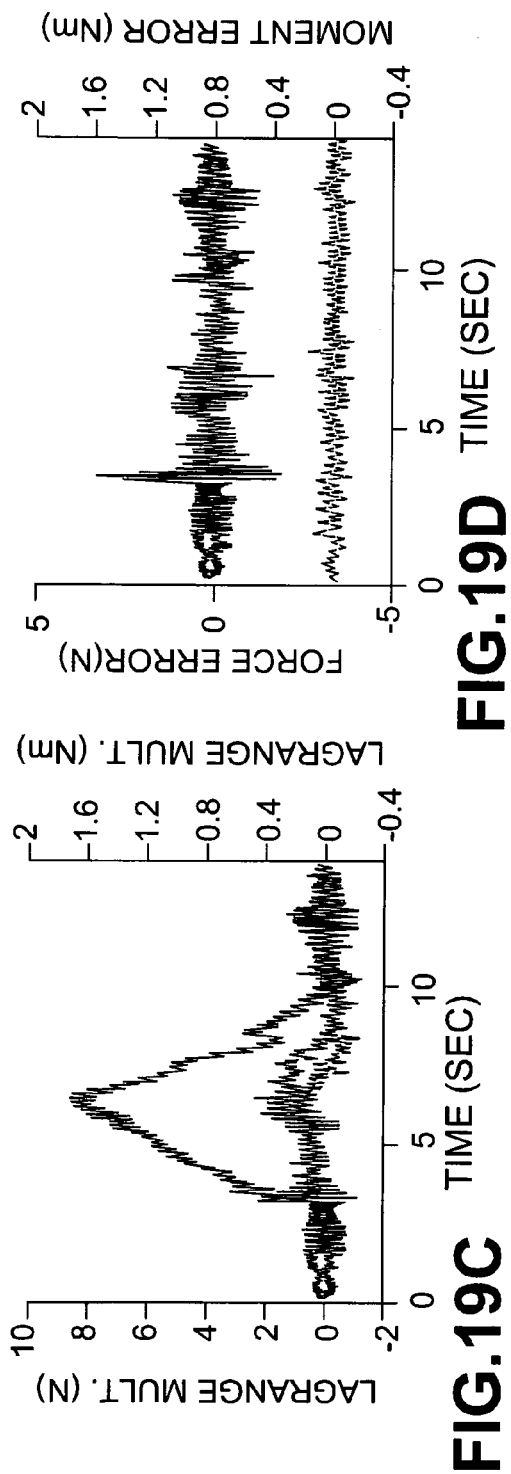

ND MATCHING OF
MANIPULATORS INTERACTING WITH
UNKNOWN ENVIRONMENTS

FIELD OF THE INVENTION

This invention relates to the field of robotics, and in particular to a method for replicating the dynamic behavior of a target robotic manipulator operating in an unknown environment by using a different robotic manipulator.

BACKGROUND OF THE INVENTION

There is growing interest in employing robotic manipulators to perform assembly tasks. In particular, space robots have become a viable means to perform extravehicular robotic tasks. For instance, the Special Purpose Dextrous Manipulator (SPDM) will be used to handle various orbital replacement units (ORU) for the maintenance operations of the International Space Station.

The complexity of a robotic operation associated with a task demands verification facility on the ground to ensure that the task can be performed on orbit as intended. This requirement has motivated the development of the SPDM task verification facility at Canadian Space Agency. The verification operation on the ground is challenging as space robots are designed to work only in micro-gravity environment. In reality, thanks to weightlessness on orbit, the SPDM can handle payloads as massive as 600 kg. On the ground, however, it cannot even support itself against gravity. Although this problem could be fixed by using a system of weights and pulleys to counterbalance gravity, the weights change the robot inertia and its dynamical, behavior. Moreover, it is difficult to replicate the dynamical effects induced by the flexibility of the space robot or space structure on which the manipulator is stowed.

Simulation is another tool that can be used to validate the functionality of a space manipulator. Although the dynamics and kinematics models of space manipulators are more complex than those of terrestrial manipulators due to dynamic coupling between the manipulator and its spacecraft, the space-robot dynamics can be captured by the concept of a Virtual-Manipulator, which has a fixed base in inertial space at a point called Virtual Ground. Today, with the advent of powerful computers, faithful and real-time simulators are available that can capture dynamics of almost any type of manipulator with many degrees of freedom. However, simulation of a robot interacting with environment with a high fidelity requires accurate modeling of both the manipulator and the contact interface between the manipulator and its environment. Faithful models of space-robots are available; it is the calculation of the contact force which poses many technical difficulties associated with contact dynamics.

In the literature, many models for the contact force, consisting of normal and friction forces, have been reported. The Hertz contact theory is used to estimate local forces. However, to predict where the contact points are, calls to an optimization routine, thus demanding substantial computational effort. In particular, the complexity of contact-dynamics modelling tends to increase exponentially when the two objects have multi-point contacts. Moreover, since the SPDM is tele-operated by a human operator, the validation process requires inclusion of a real-time simulation environment since the simulation should allow human operators to drive the simulation in real-time.

The greatest challenge in the control of robots interacting with an unknown environment is to establish a desired impedance characteristic while maintaining stability of the contact between the robot and the environment. Typically, the parameters of the impedance controller, i.e., desired mass, damping and stiffness matrices, are tuned by trial-and-error to achieve stability and a satisfactory performance. This is not effective because the performance is not optimal and control parameters are valid only for a particular environment; they often need to be changed as the environment changes.

Impedance control is suitable for robotic tasks such as assembly or insertion operations to avoid jamming among parts. The impedance captures the dynamical relation between position and force of a robot's end-effector. The underlying idea of impedance control is to assign a prescribed dynamic behavior for a robot manipulator while its end-effector is interacting with the environment. It is known that any assigned impedance may not lead to contact stability even if the desired impedance per se is stable. In practice, the parameters of the impedance controller, i.e., desired mass, damping and stiffness matrices, are tuned by trial-and-error to achieve stability and a satisfactory performance. Typically, the control parameters are valid for a particular environment and they often need to be changed as the environment changes.

The impedance control of a robot to shape the robot force-response was proposed by Hogan, "Impedance Control: An approach to manipulation", Journal of Dynamics, Measurement, and Control, vol. 107, pp. 8-16, 1985, the contents of which are herein incorporated by reference. In his approach the force is virtually controlled by controlling position by using programmable stiffness and damping matrices in the impedance model. Analysis and general methodology for implementation of attaining the desired impedance have been the focus of many other research works. All control approaches are based on the premise that a perfect model of the manipulator and ideal source of joint torque, i.e., no actuator dynamics, are available and that the robot is rigid. Therefore, the control system can trivially assign infinite stiffness to the manipulator and then the desired impedance of the target robot can be achieved by cascading the transfer function of desired impedance model.

In practice, the robot prototype has a finite bandwidth and stiffness that impose a serious limitation on the impedance that can be attained in a stable manner. In other words, the conventional impedance control methodology does not guarantee that a passive mechanical admittance will result from the design and hence contact instability may occur for a class of environment impedance. Also, the conventional impedance approach doesn't allow a generic desired-impedance; only the second order system of mass-spring-damper is allowed.

SUMMARY OF THE INVENTION

The invention employs an emulation technique which can replicate dynamical behavior of a robot interacting with a complex environment without actually simulating the environment. The system consists of three main functional elements: a real-time simulator capturing the dynamics of the space robot, the mock-up of the payload and its work site, and a rigid robot which handles the payload. Interconnecting the simulator and the emulating robot, the entire system works in a hardware-in-loop simulation configuration.

Accordingly one aspect of the invention provides a system for replicating the behavior of a target robotic manipulator with respect to a payload and worksite, comprising a real-time simulator capturing the dynamics of the target robot manipulator; a mock-up of said payload and worksite; and an emulating robotic manipulator for interacting with said payload and worksite; said emulating robotic manipulator being controlled by said real-time simulator in a control loop to replicate the dynamical behavior of said target robotic manipulator in its environment by matching the impedance of the emulating robotic manipulator with that of the target robotic manipulator.

In accordance with the principles of the invention the impedances of a space robot and a ground-based robot are matched as much as possible in order to replicating contact force response which would be encountered on orbit.

An important aspect of the invention is a mu-based controller for impedance control of manipulators which achieves the followings. (i) minimizes the weighted distance between the realized and the specified force transfer functions, (ii) minimizes noise sensitivity, and (iii) maintain closed-loop stability in spite of a broad variation of environment parameters (stiffness and damping). This approach allows the desired impedance in a generic form, i.e., the desired impedance to be represented by any stable transfer function. This is important for robot emulation where the desired impedance is typically more complex than the standard second order system.

In one embodiment of the invention the control methodology is implemented by the following steps:

a) Apply a motion control law to the emulating robot. The motion controller should have sufficient bandwidth for adequate maneuvering in free space. The effect of tip force/moment perturbation should be compensated with the best knowledge of the robot's model.

b) Obtain the impedance the target-robot—which constitutes the desired impedance—by either a spectral analysis of input/output data or linearization of the dynamics model.

c) Identify experimentally the open-loop admittance of the actual robot (admittance is inverse of impedance) from a sequence of input-output data obtained by excitation of the robot in contact. Then, calculate the coefficient of a fixed transfer function to match the input/output behavior.

d) Specify the range of variation on the environment's stiffness and damping. Then build a parametric uncertainty model. Also, define the frequency range of interest on which the impedances should be matched.

e) Built a LFT (Linear Fractional Transformation) model based on the performance specification and the uncertainty model. Then design a mu-controller for the force feedback.

Novel aspects of this approach are believed to include a stiff motion controller which maintains the endpoint pose of the emulating robot and that of the simulated robot; a method for expressing the unknown environment parameters in the form of a parametric uncertainty-model which is bounded and hence it is suitable for a robust control synthesis; and experimental identification procedure for the measurement of the robot impedance; and a mu-synthesis based force feedback which achieves the desired impedance and ensures contact stability for all environment impedances specified.

In accordance with the principles of the invention, the impedance of the emulator manipulator is matched with the impedance of the target manipulator. The control system can change the impendence of a manipulator to match that of a prescribed manipulator (e.g., a space robot) as much as possible while maintaining stability of the manipulator in contact with a class of unknown environments. Since the force/moment interaction of a manipulator with an environment can be captured by the impedance, the matching impedance of the two manipulators is tantamount to matching their force responses with respect to the same environment.

The invention proposes two different methods to deal with the emulation problem: The first is based on a non-linear approach and can match the non-linear dynamic responses. However, the control requires an emulating robot which is rigid, its dynamics model is exactly known, and its joints' actuators are ideal, i.e., actuator with no dynamics. The second deals with matching of linear impedance. This method assumes that the impedance of the robot can be captured by a linear model, i.e., by a transfer function, and subsequently the control design is conveniently cast in the frequency domain. This linear impedance-matching is more practical than the former one because: (i) It doesn't require ideal emulating robot, i.e., the structural flexibility and the actuator dynamics are allowed, (ii) no parametric model of the robots is needed; the impedance of the emulating robot can be measured directly using spectral analysis.

Experiment on the SPDM Task Verification Facility at CSA has proved that without such a scheme contact stability cannot be achieved. Notably, a similar facility in DLR (the German space agency and NASDA) has failed to produce a stable contact.

The mu-synthesis based controller in accordance with the principles of the invention optimally compromises the performance and stability requirements for a selected class of environments. Specifically, the controller minimizes the weighted distance between the realized and the specified impedances (or force transfer functions); minimizes the sensitivity to force/moment sensor noise; and maintains the closed-loop stability in spite of a broad variation of environment parameters (stiffness and damping).

BRIEF DESCRIPTION OF THE DRAWINGS

The invention will now be described in more detail, by way of example only, with reference to the accompanying drawings, in which:

FIG. 4 shows a robot-emulation scheme with the application of the rheonomic constraint in which the simulator comprises the DAE model of the target robot;

FIG. 5 shows a robot-emulation scheme without the application of the constraint; the simulator comprises the ODE model of the target robot;

FIGS. 8A and B are diagrams of the emulating robot system, comprised of the stimulator cascaded with the emulating robot (A), in a cascaded configuration and the simulator cascaded with the lumped model of emulating robot system (B);

FIGS. 16A and B show the unstable contact where Q>4; tip position (A), and contact force (B);

FIG. 17 shows the 3-dof experimental setup;

FIG. 19 shows the experimental results obtained form emulation of the thee-dof robot Simulated position and force responses; two actuated joints;

DETAILED DESCRIPTION OF THE PREFERRED EMBODIMENTS

Figure 1A:
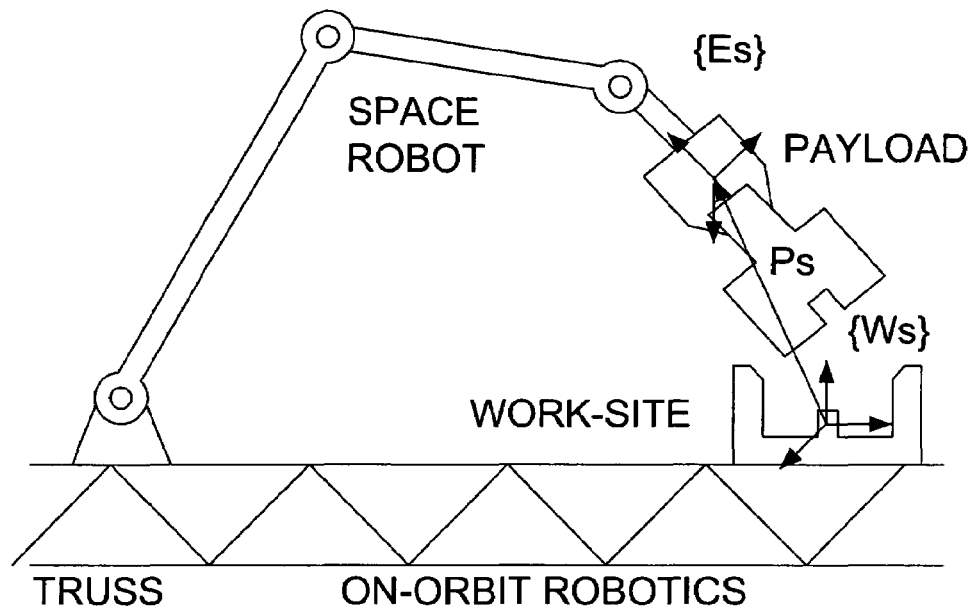
FIGS. 1A and B are schematic diagrams of a space manipulator (A) and emulating manipulator (B) performing a task.
Figure 1B:
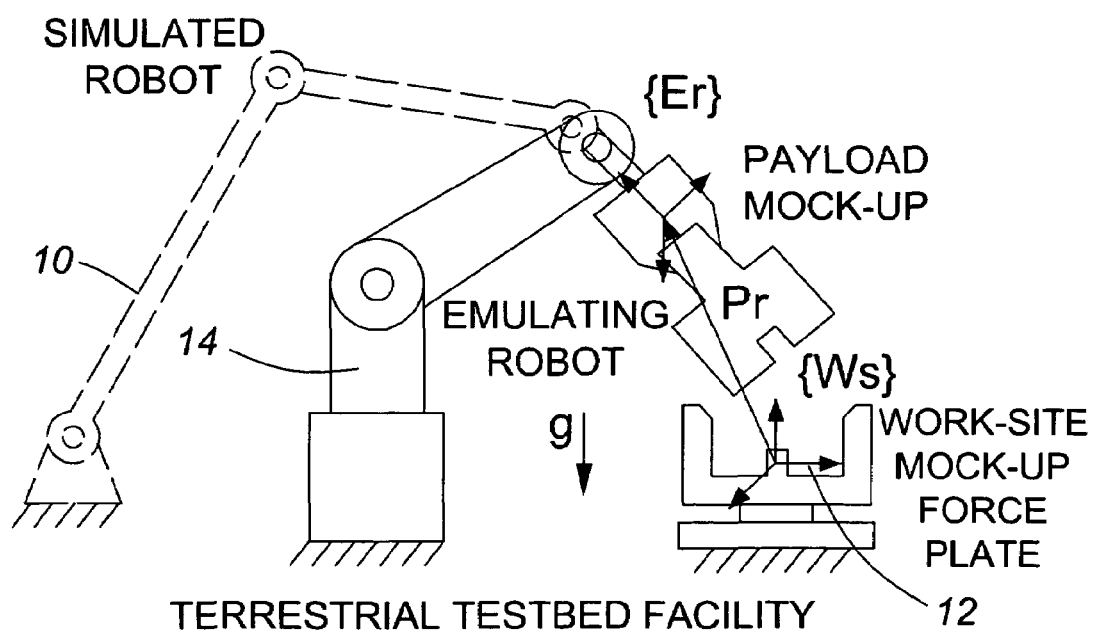

FIG. 1 schematically illustrates the concept of a robot emulation system. The system consists of three main functional elements: a real-time simulator capturing the dynamics of the space robot 10, the mock-up of the payload and its work-site 12, and a rigid robot 14 which handles the payload. Interconnecting the simulator and the emulating robot, the entire system works in a hardware-in-loop simulation configuration that permits replication of the dynamic behavior of the space robot.

The purpose of the control system is to make the constrained-motion dynamical behavior of the emulating robot as close as possible to that actually encountered by the space robot. The advantage of this methodology is that there is no need for modeling a complex environment. Moreover, because of using the real hardware, a visual cue of the payload and the work-site is available which otherwise, must be simulated.

Figure 2:
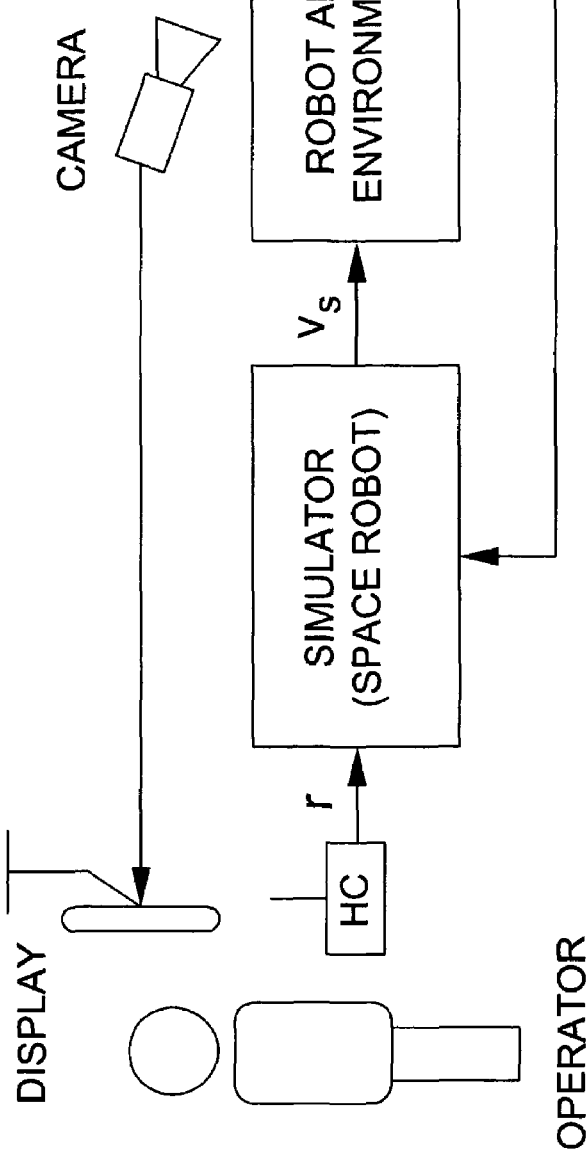
FIG. 2 is a block diagram of a robotic emulating system.

FIG. 2 shows the concept of emulation of the space robot. Dynamics of the space robot is numerically simulated and a real-time simulator drives a robot prototype which performs contact task. The contact force and moment resulting from the interaction of the real robot end-effector and the environment are measured by a force plate and the signals are feedback into the space robot simulator, which in turn, affects the control commands. For implementation of the control law, it is assumed that (i) knowledge of dynamics of the emulation robot; (ii) ideal source of joint torque are available. Based on these premises the control law triviality compensates the effect of contact force resulting in infinite stiffness and perfect motion tracking in contact phase. Moreover, the exact compensation of contact force decouples dynamic interaction of the simulator and the emulating robot systems which are connected in a closed-loop configuration, see FIG. 2. However, in practice, the control system of the emulating robot has finite bandwidth and stiffness and is susceptible to instability.

To achieve a high fidelity force response from the emulating robot requires that its impedance matches that of the space robot. The emulating robot is rigid-body while the space robots are typically flexible. A complete knowledge of the dynamic model of the robot is needed to implement the desired impedance.

In accordance with the principles of the invention, a synthesis-based controller for shaping force response of a robot according to a desired response even with the presence of variation of the environment parameters (stiffness and damping) is used. The performance is defined in terms of distance between the actual and desired force responses and also sensitivity to the force sensor noise, while the variation of the environment impedance enters as a perturbation. The controller achieves robust performance and contact stability.

Nolinear Control of Emulating Robot

Let's consider an emulating robot and a target robot, referred to by subscripts r and s, with n and m degrees-of-freedom (DOF), respectively, operating in an n-dimensional task space. The generalized coordinates of the robots are represented by vectors $q_r \in R^n$ and $q_s \in R^m$, respectively. Note that the emulating robot is rigid but the space robot is typically a flexible one with many degrees-of-freedom. Hence, we can say $$\dim(q_s) = m \geq \dim(q_r) = n.$$

Let vector $p_r^T = [x_r^T, \phi_r^T]$ denote the pose of the end-effector of the emulating robot, where $x_r$ and $\phi_r$ describe, respectively, the position and a minimal representation of the orientation of the end-effector expressed in the base frame attached to the work-site; see FIG. 1. Similarly, the pose of the target robot is denoted by vector $p_s$.

Assume that
1. both robots have identical end-effector pose configuration with respect to their base frames, i.e., $p_r = p_s = p$ and
2. they experience the same contact force/moment $f \in R^n$.

Moreover, we assume that $M_r \in R^{n \times n}$ and $M_s \in R^{m \times m}$ are the inertia matrices of the two manipulators; $h_r \in R^n$ and $h_r \in R^m$ contain Coriolis, centrifugal, friction, gravity (for the emulating robot), and stiffness (for the space robot); $\tau_r \in R^n$ and $\tau_s \in R^n$ are the joint torque vectors; and that $J_r = \partial p_r / \partial q_r \in R^{n \times n}$ and $J_s = \partial p_s / \partial q_s \in R^{n \times m}$ are the analytical Jacobian matrices. Then, the equations of motion of the robots can be described by $$M_r \ddot{q}_r + h_r(q_r, \dot{q}_r) = \tau_r + J_r^T f_a, \quad (1)$$

$$M_s \ddot{q}_s + h_s(q_s, \dot{q}_s) = B\tau_s + J_s^T f_a, \quad (2)$$

where $$B = \begin{bmatrix} I \\ 0 \end{bmatrix} \in R^{m \times n},$$

and $f_a \in R^n$ is the vector of generalized constraint force expressed in the base frame. Note that $f_a$ performs work on $\dot{p}$, and it is related to the contact force f by $$f_a = \Lambda(\phi) f, \quad (3)$$

where $\Lambda(\phi) = \text{diag}\{I, \Lambda_1(\phi)\}$ is a transformation matrix that depends on a particular set of parameters used to represent end-effector orientation; $\phi_s = \phi_r = \phi$.

Now, assume that a real-time simulator captures the dynamics of the space robot. Also, assume that the endpoint pose of the simulated robot be constrained by that of the emulating robot, i.e., the following rheonomic (time-varying) constraint $$\Phi(q_s, q_r(t)) = p_r(q_r(t)) - p_s(q_s) \equiv 0 \quad (4)$$

holds. Enforcing the constraint ensures that the end-effector of the simulated robot is constrained by the pose of the environment barriers, which physically constrain the emulating robot. The Lagrange equations of the simulated robot can be formally expressed by a set of Differential Algebraic Equations (DAE) as $$M_s \ddot{q}_s + \Phi_{q_s}^T \lambda = -h_s + B\tau_s, \quad (5)$$

$$\Phi(q_s, t) = 0 \quad (6)$$

where $\Phi_{q_s} = \partial \Phi/\partial q_s = -J_s \in R^{m \times n}$ denotes the Jacobian of the constraint with respect to $q_s$, and $\lambda \in R^n$ represents the Lagrange multiplier which can be solved from equation (5) together with the second time derivative of the constraint equation (6). That is, $$\lambda = (J_s M_s^{-1} J_s^T)^{-1}(c + J_s M_s^{-1}(h_s - B\tau_s)), \quad (7)$$

where $c = \ddot{p}_r(t) - \dot{J}_s \dot{q}_s$; note that the constraint force $\lambda$ can be measured only if a measurement of pose acceleration $\ddot{p}_r$ is available, say via an accelerometer.

A comparison of equations (5) and (2) reveals that the Lagrange multiplier $\lambda$ acts as a constraint force/moment on the simulated robot. Therefore, our goal is to equate the constraint force and the Lagrange multiplier, i.e., $f_a = \lambda$. This can be achieved by using the computed torque method in the task space. Substituting the joint acceleration from (1) into the second time derivative of the pose, $\ddot{p}_r = J_r \ddot{q}_r + \dot{J}_r \dot{q}_r$, yields $$\ddot{p}_r = J_r M_r^{-1}(\tau_r + J_r^T f_a - h_r) + \dot{J}_r \dot{q}_r. \quad (8)$$

This equation can then be substituted into (7) to obtain the joint torque solution, assuming $f_a = \lambda$. That is $$\tau_r^c = h_r + M_r J_r^{-1}\left(J_s M_s^{-1}(B\tau_s - h_s) + \dot{J}_s \dot{q}_s - \dot{J}_r \dot{q}_r\right) - \underbrace{J_r^T(I - M_r M_s^{-1}) f_a}_{\text{force feedback}}, \quad (9)$$

where $M := [JM^{-1}J^T]^{-1}$ is the Cartesian inertia matrix whose inverse can be interpreted as mechanical impedance. The torque control (9) can be grouped into force and motion feedback terms.

The force feedback gain tends to decrease when the inertia ratio approaches one. In the limit, i.e., when $M_s = M_r$, the force feedback is disabled, and hence the robot emulation can be realized without using force feedback.

In free space, where $f_a = 0$, the controller matches the endpoint poses of two robots at acceleration level and that inevitably leads to drift. We can improve the control law by incorporating a feedback loop to minimize the drift error, i.e., $$\tau_r^c = h_r - M_r J_r^{-1} \dot{J}_r \dot{q}_r - J_r^T f_r + \\ M_r J_r^{-1}\left[\tilde{a}_s - G_v\left(J_r \dot{q}_r - \int \tilde{a}_s dt\right) - G_p\left(p_r(q_r) - \int\int \tilde{a}_s dt\right)\right] \quad (10)$$

where $\tilde{a}_s := J_s M_s^{-1}(B\tau_s - h_s) + \dot{J}_s \dot{q}_s + J_s M_s^{-1} J_s^T f_a$ is the estimated pose acceleration of the target robot calculated from the unconstrained dynamics model, and $G_v > 0$ and $G_p > 0$ are drift compensation gains. In the following, we show that the constraint force asymptotically tracks the Lagrange multiplier. Denoting $$\ddot{e}_p := \ddot{p}_r - \tilde{a}_s,$$

then the dynamics of the errors under the control law (10) is $$\ddot{e}_p + G_v \dot{e}_p + G_p e_p = 0. \quad (11)$$

This dynamics is asymptotically stable if the gain parameters are adequately chosen, i.e., $e_p, \dot{e}_p, \ddot{e}_p \to 0$ as $t \to \infty$. Furthermore, let $$e_f := f_a - \lambda, \quad (12)$$

represent the force error. Then, one can show from (7) that the force error is related to the acceleration error by $$e_f = M_s \ddot{e}_p. \quad (13)$$

Since the mass matrix is bounded, i.e. $\exists \kappa > 0$ such that $M_s(q_s) \leq \kappa I$, then $$\|e_f\| \leq \kappa \|\ddot{e}_p\|$$

and hence $e_f \to 0$ as $t \to \infty$. Therefore, the error between the constraint force and the Lagrange multiplier is asymptotically stable under the control law (10). The above mathematical development can be summarized in the following proposition.

Assume the followings: (i) the endpoint pose of the simulated robot is constrained with that of the emulating robot performing a contact task, (ii) the torque control law (10) is applied on the emulating robot. Then, (i) the emulating robot produces the end-effector motion of the space robot, (ii) the constraint force asymptotically approaches the Lagrange multiplier: $f_a \to \lambda$.

In this case, the simulated robot behaves as if it interacts virtually with the same environment as the emulating robot does. In other words, the combined system of the simulator and the emulating robot is dynamically equivalent to the original target robot.

Calculating States of the Flexible Robot

To implement control law (10) the values of $q_r$, $q_s$, and their time derivatives are required. Vectors $q_r$ and $\dot{q}_r$ can be measured, but $q_s$ and its time derivative should be obtained by calculation. Consider the rheonomic constraint $\Phi(q_r(t), q_s) = 0$ whose differentiation with respect to time leads to $$J_s \dot{q}_s = J_r \dot{q}_r(t) = \dot{p}_r(t) \quad (14)$$

In the case that both robots have the same number of degrees of freedom, i.e., m=n, one can obtain $\dot{q}_s$ uniquely from the above equation. Subsequently, $q_s$ can be found algebraically through solving inverse kinematics $\Phi(q_r(t), q_s) = 0$, that is $q_s = \Omega(q_r(t))$. Although, more often an explicit function may not exist, one can solve the set of nonlinear constraint equations numerically, e.g., by using the Newton-Raphson method, as elaborated in Appendix A. Alternatively, an estimation of $q_s$, can be solved by resorting to a closed-loop inverse kinematic (CLIK) scheme based on either the Jacobian transpose or the Jacobian pseudoinverse.

Since the emulating robot is structurally rigid while the simulated robot is usually flexible, we can say n<m. Therefore, there are less equations than unknowns in (14). The theory of linear systems equations establishes that the general solution can be expressed by $$\dot{q}_s = \dot{q}_s^P + P\xi, \quad (15)$$

where $$\dot{q}_s^P := J_s^+ \dot{p}_r(t) = J_s^+ J_r \dot{q}_r(t). \quad (16)$$

is the particular solution and $P\xi$ represents the general solution of the homogenous velocity. In the above $J_s^+ = J_s^T(J_s J_s^T)^{-1}$ is the pseudoinverse of $J_s$, P is a projection matrix whose columns annihilate the constraints, i.e., $J_s P = 0$, and $\xi \in R^{n-m}$ is the independent coordinate, which represents the self-motion of the robot.

Similarly, the general solution of acceleration can be found from the second derivative of the constraint equations as $$\ddot{q}_s = P\ddot{\xi} + J_s^+ c \quad (17)$$

with c defined previously below (7). Now, substituting the acceleration from (17) into (5) and premultiplying by $P^T$ and knowing that that $P^T$ annihilates the constraint force, i.e., $p^T J_s^T = 0$ we arrive at $$N\ddot{\xi} = P^T h_s + v, \quad (18)$$

where $N = P^T M_s P$ and $v = P^T M_s J_s^+ c$. Equation (18) expresses the acceleration of the independent coordinates in closed-form that constitutes the dynamics of the independent coordinates.

Figure 3:
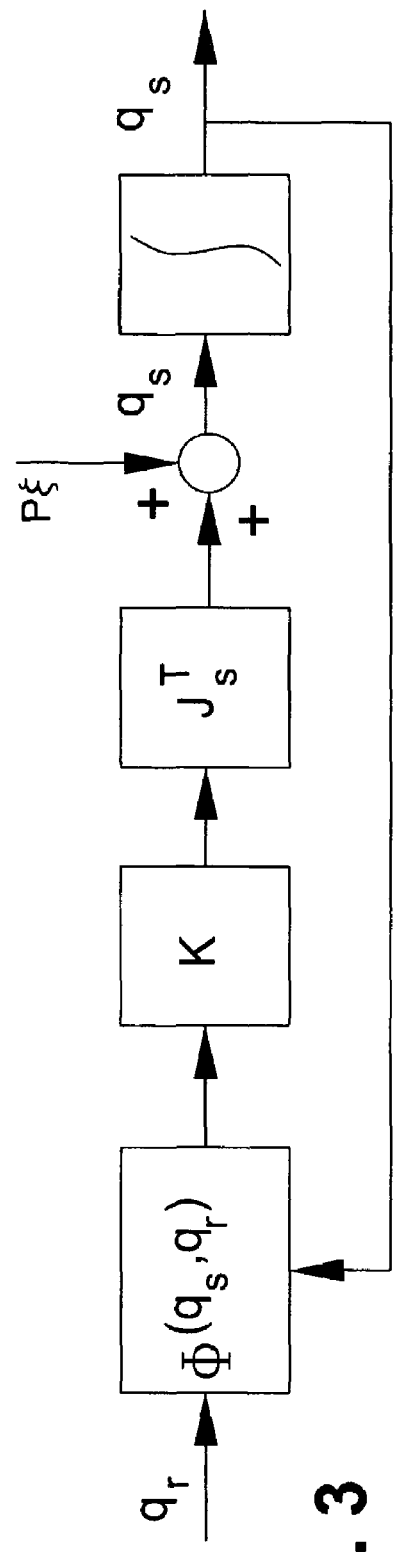
FIG. 3 is a block diagram showing a CLIK jacobian transpose scheme for extracting the generalized coordinate of a target manipulator.

Now, one can make use of the dynamics equation to obtain the velocity of independent coordinate $\xi$ by numerical integration; that, in turn, can be substituted in (15) to yield the velocity $\dot{q}_s$. Subsequently, $q_s$ can be obtained as a result of numerical integration. However, since integration inevitably leads to drift, we need to correct the generalized coordinate, e.g., by using. the Newton-Raphson method, in order to satisfy the constraint precisely. Alternatively, an estimate of the generalized coordinates of the target robot can be solved by resorting to a closed-loop inverse kinematics (CLIK) scheme, where the inverse kinematics problem is solved by reformulating it in terms of the convergence of an equivalent feedback control systems. FIG. 3 illustrates the Jacobian transpose CLIK scheme to extract the generalized coordinates of a redundant system whose null-space component $P\xi$ and $q_r$ are considered as input channels. The feedback loop after the integration of the velocity ensures that constraint error can be diminished by increasing the feedback gain. More specifically, assume that a gain matrix K is positive-definite and that the Jacobian matrix $J_s$ is of full rank. Then, the closed-loop inverse kinematics solution based on a control law $\dot{q}_s = P\xi + J_s^T K\Phi(q_s, q_r(T))$, see FIG. 3, ensures that the constraint error is ultimately bounded into an attractive ball centered at $\Phi = 0$; the radius of the ball can be reduced arbitrarily by increasing the minimum eigenvalue of the gain matrix.

To summarize, the robot emulation can proceed in the following steps:
1. Start at the time when the entire system states, i.e., $\{q_s, \dot{q}_s, q_r, \dot{q}_r\}$, are known.
2. Apply the control law (10).
3. Upon the measurement of the emulating-robot joint angles and velocities, simulate independent states of the target robot by making use of the acceleration model (18).
4. Solve the inverse kinematics, e.g., by using the CLIK, to solve the generalized coordinate of the target robot; then go to step 1.

FIG. 4 illustrates the implementation of the robot-emulation scheme with the application of the rheonomic constraint. Note that the target robot is modelled as a rheonomically constrained manipulator and the equations of motion are represented by the DAE system.

Flexible-Joint Case Study

In the case of a robot with flexible-joint, the generalized coordinates of the simulated flexible-joint robot are given by $q_s^T = [q_{s1}^T \ q_{s2}^T]$, where vectors $q_{s1}$ and $q_{s2}$ represent the joint angles and motor angles, respectively. Since only the joint angles contribute to the robot end-effector motion, we have $\Phi(q_{s1}, q_r) = 0$, which implies that the Jacobian of flexible-joint manipulators should be of this form $$J_s = [J_{s1} \ 0] \quad (19)$$

Assuming submatrix $J_{s1}$ is invertible means that the joint variables can be derived uniquely from the mapping below $$\dot{q}_{s1} = J_{s1}^{-1} J_r \dot{q}_r. \quad (20)$$

The independent coordinates, which are comprised of the motor rotor angles, should be obtained through simulation. The structure of Jacobian (19) specifies the projection matrix as $$P = \begin{bmatrix} 0 \\ I \end{bmatrix}. \quad (21)$$

Moreover, the dynamics model of flexible-joint manipulators can be written as $$\begin{bmatrix} M_{s1} & M_{s12} \\ M_{s12}^T & M_{s2} \end{bmatrix} \begin{bmatrix} \ddot{q}_{s1} \\ \ddot{q}_{s2} \end{bmatrix} = \begin{bmatrix} h_{s1} \\ h_{s2} \end{bmatrix} + \begin{bmatrix} 0 \\ \tau_s \end{bmatrix} \quad (22)$$

Finally, substituting the parameters from (21) and (22) into (18) yields $N = M_{s2}$ and $v = M_{s21} J_{s1}^{-1} c$. Hence, the acceleration model of the independent coordinates is given by $$\ddot{q}_{s2} = \ddot{\xi} = M_{s2}^{-1}(h_{s2} + \tau_s + M_{s12} J_{s1}^{-1} c), \quad (23)$$

which can be numerically integrated to obtain $\dot{q}_{s2}$.

Simulation Without Applying the Constraints

The robot emulation problem can be reformulated without imposing the kinematic constraint. Indeed, one can show that the control law can maintain the asymptotic stability of the constraint condition if the dynamics model of the emulating robot is accurately known. Assume that the constraint is no longer applied to the simulated robot. In other words, the dynamics of the target robot is described by (2), which is an Ordinary Differential Equation (ODE). Then, we can obtain the complete states of the target robot from integration of the acceleration $$\ddot{q}_s = M_s^{-1}(B\tau_s - h_s + J_s^T f_a).$$

It can be readily shown that the dynamics of the constraint error under the control law (10) is described by $$\ddot{\Phi} + G_v \dot{\Phi} + G_p \Phi = 0. \quad (24)$$

Therefore, by selecting adequate gains, the constraint error is exponentially stable, $\Phi, \dot{\Phi} \to 0$ as $t \to \infty$.

FIG. 5 illustrates the concept of robot emulation without the application of the constraint. Note that the simulator contains the dynamics model of the target robot in the ODE form.

Topological Difference Between the Two Robot-Emulation Schemes

Both emulation schemes establish identical force/motion dynamics between the end-effector of the emulating-robot and that of the target robot. The difference between the two schemes, however, lies in how the simulator is synchronized with the actual emulating robot. In the first scheme, FIG. 4, the end-effector pose of the simulated robot is rheonomically constrained with that of the actual robot, then the controller matches trajectories of the simulated constraint force, i.e. the Lagrange multiplier, and that of physical constraint force. In the other hand, in the second scheme, FIG. 5, the physical constraint force is input to the simulator and the controller matches the pose trajectories of the simulated and the actual robots. The former scheme requires that the simulated robot be rheonomically constrained and hence the simulator comprises a DAE system, whereas the latter scheme does not require the application of the constraint and hence the simulator comprises an ODE system. Ideally, both schemes should yield the same result. But in presence of lumped uncertainty and external disturbance, as shall be discussed in the next section, the first and the second schemes result in pose error and constraint force error, respectively.

Stability and Performance Analysis

Since there is small displacement during the contact phase, the velocities and centripetal and Coriolis forces go to zero and also the mass inertia matrices and the Jacobian matrices can be assumed constant. Hence we will proceed with the frequency domain analysis.

Effect of Disturbance

In practice, the fidelity of the robot-emulation is adversely affected by disturbance and sensor noise. Assume vector d capture the disturbance caused by error in the contact force/moment measurement, sensor noise, and lumped uncertainty in the robot parameters such as uncompensated gravitational forces and joint frictions. Then, the robot dynamics in presence of the disturbance can be written as $$M_r \ddot{q}_r + h_r = \tau_r + J_r^T(f_a + d). \tag{25}$$

In the following, the effect of the additive disturbance on the two schemes shall be investigated. In the case of the robot-emulation without application of the constraint, the dynamics of the constraint error (24) is no longer homogeneous. The transmissivity from the disturbance to the constraint error can be obtained in the Laplace domain by $$\Phi = s^2 Z(s)^{-1} M_r^{-1} d, \tag{26}$$

where $$Z(s) = \frac{s^2}{s^2 + G_v s + G_p}$$

can be interpreted as the admittance of the motion controller. It is apparent from (26) that decreasing the inertia of the emulating-robot makes the constraint error more sensitive to the disturbance and the sensor noise.

In the contrast, the robot emulation scheme with the application of the constraint naturally fulfills the constraint condition even in presence of the external disturbance. However, the simulated and the emulating robots may no longer experience identical constraint force. One can obtain the transmissivity from the disturbance to the force error in the Laplace domain by $$e_f = -Z(s)Qd, \tag{27}$$

where $Q = M_s M_r^{-1}$ is the inertia ratio of the two robots. Adequate choice of gains implies that $\|Z\|_\infty = 1$. Hence, we can say $\|e_f\| \leq \bar{\sigma}(Q)\|d\|$, where $\bar{\sigma}(\cdot)$ denote the maximum singular value.

The magnitude of the sensitivity of the force error to the disturbance depends on the inertia ratio; the higher the ratio $\|Q\|$, the more sensitivity. Roughly speaking, choosing a massive emulating robot is preferable because that minimizes the disturbance sensitivity of the emulating system to sensor noise and disturbance.

Actuator Dynamics and Contact Stability

Practical implementation of the control law requires ideal actuators. In free space, the actuator dynamics can be neglected, because the fast dynamics of the actuators is well masked by relatively slow dynamics of the manipulator. In contact phase, however, where the velocity tends to be zero, the manipulator losses its links dynamics. In this case, the simulator and actuators form a closed-loop configuration which may lead to instability.

In the contact phase, the emulating-robot develops constraint force/moment as result of its joint torques, i.e. $f_a = -J_r^{-T} \tau_r$. The joint torques, in turn, are a function of the contact force according to the torque-control law (10). This input-output connection forms an algebraic loop which cannot be realized in a physical system unless the actuator dynamics is taken into account. In fact, the emulating-robot cannot produce joint torque instantaneously due to finite bandwidth of its actuators and time delay. Let transfer function H(s) represent the actuator dynamics, i.e., $\tau_r = H(s)\tau_r^c$, where $\tau_r^c$ is joint torque command. Then, the contact force developed by the emulating-robot is $$f_a = -H(s) J_r^{-T} \tau_r^c \tag{28}$$

Assuming negligible velocity and acceleration at the contact, i.e. $\dot{q}_r \approx 0$. Then, substituting the torque-control law (10) into (28) yields $$f_a = H(s)f_a - H(s)Z(s)^{-1}Q^{-1}f_a - H(s)Z(s)^{-1}Q^{-1}\lambda \tag{29}$$
$$= -L(s)(f_a - \lambda),$$

where $L(s) = Q^{-1} L'(s)$ is the loop-gain transfer function and $L'(s) = H(s)/(Z(s) - Z(s)H(s))$; recall that $Z(s)$ and $Q$ have been already defined in the previous section. It is clear from (29) that the actuator dynamics is responsible to form a force feedback loop which only exist if the actuator has finite bandwidth, otherwise the force terms from both sides of equation (29) are cancelled out.

According to the Nyquist stability criterion for a multivariable system, the closed-loop system is stable if and only if the Nyquist plot of det(I+L(s)) does not encircle the origin. This is equivalent to say that there must exist a gain $\epsilon \in (0\ 1]$ such that $$\det(I + \epsilon L(s)) \neq 0\ \forall s > 0 \tag{30}$$

Since $\det(I+\epsilon L) = \Pi_i \lambda_i (I+\epsilon L)$, $\lambda_i(I+\epsilon Q^{-1}L') = 1 + \epsilon L' \lambda_i(Q^{-1})$, and $\lambda_i(Q^{-1}) = 1/\lambda_i(Q)$, the stability condition (30) is equivalent to the following $$\epsilon L'(s)/\lambda_i(Q) + 1 \neq 0\ \forall s > 0, \forall i, \forall \epsilon \in (0,1] \tag{31}$$

Let the actuator dynamics (or time delay) be captured by a first-order system $$H(s) = \frac{1}{1 + \omega_a^{-1} s},$$

where $\omega_a$ is the actuator's bandwidth, i.e., $$L'(s) = \frac{s^2 + G_v s + G_p}{\omega_a^{-1} s^3}.$$

Then, the characteristic equation of (31) is given by $$\frac{\lambda_i(Q)}{\varepsilon \omega_a} s^3 + s^2 + G_v s + G_p \neq 0$$

$$\forall s > 0, \ \forall i, \ \forall \varepsilon \in (0, 1]$$

Since the inertia matrices are always positive definite, one expects that matrix Q is positive definite too. Assume that $\lambda_i(Q)>0$, $G_p>0$, and $G_v>0$. Then, according to the Routh-Hurwitz stability criterion, one can show that the above equation has no roots in the right-half plane if and only if $\lambda_i(Q)>0$ and $$-\lambda_i(Q)(\varepsilon \omega_a)^{-1} G_p + G_v > 0 \ \forall i, \forall \varepsilon \in (0,1] \quad (32)$$

$$\Leftrightarrow \lambda_{max}(Q) < \frac{2\omega_a}{\omega_p},$$

where $\omega_p = 2G_p/G_v$ is the bandwidth of the controller. The above development can be summarized in the following proposition Assume matrices $M_r$ and $M_s$ represent the Cartesian inertia of the emulating and the target robots, respectively. Also assume that the control law (10) with bandwidth $\omega_p$ be applied to the emulating-robot whose actuators have bandwidth $\omega_a$. Then, the emulating-robot can establish a stable contact if matrix $Q=M_s M_r^{-1}$ remains positive-definite and its maximum eigenvalue is bounded by $2\omega_a/\omega_p$.

The stability condition (32) imposes a lower bound limit on the ratio of Cartesian inertia matrix of the emulating robot to that of the simulated robot.

Since $|\lambda_{max}(Q)| \leq \overline{\sigma}(Q)$, remarks 2 and 3 imply that the low disturbance sensitivity and contact stability requirements relating to Q are not in conflict.

Force Transmissivity

The Lagrange multiplier is no longer consistent with $\lambda \equiv f_a$ in presence of actuator dynamics. Assuming stable contact, one can show from (29) that the constraint force $f_a$ is related to the Lagrange multiplier $\lambda$ by $$f_a = T(s)\lambda$$

where $$T(s) = [I + L(s)]^{-1} L(s) \quad (33)$$
$$= [Q + L'(s)I]^{-1} L'(s)$$

is the transmissivity transfer function.

In presence of actuator dynamics, the force response of the emulating-robot depends on the inertia ratio of the two robots.

Figure 6:
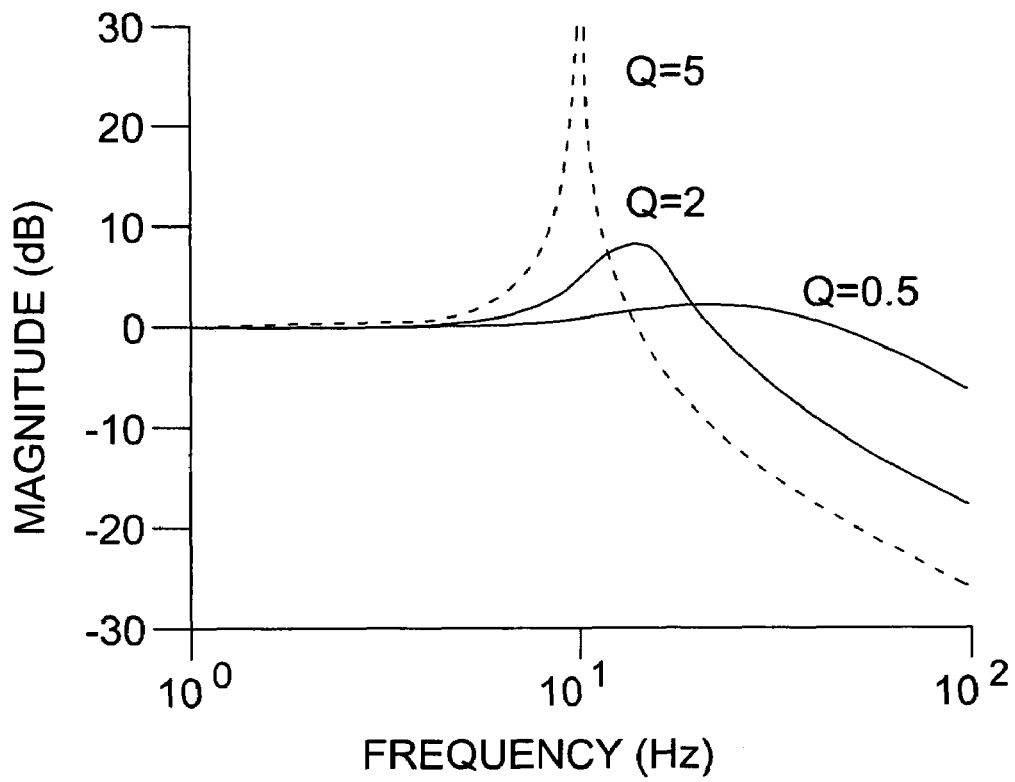
FIG. 6 is a graph of $|T(jw)|$.

A high fidelity emulation requires that $|T(s)|$ be flat over a wide bandwidth and then roll-off at high frequency. The graph of $|T(j\omega)|$ for a scaler case is shown in FIG. 6 for $\omega_p=10$, $\omega_a=25$, and different values of Q. Note that according to (32), contact stability requires Q<5. It is evident from the figure that Q has to be sufficiently larger than the critical value Q=5 in order to avoid the resonance.

Design Considerations

The fidelity and the stability of the emulation scheme has been analyzed. In this regard, the inertia ratio of the two robots, $Q=M_s M_r^{-1}$, turned out to be an important factor. Specifically, the analysis has yielded the following results:

1. $\|Q\| \gg 1$ makes the emulating system sensitive to force/moment sensor noise and disturbance; a low-noise force/moment sensor is required.
2. $\lambda_{max}(Q) \gg 1$ may lead to contact instability due to actuator dynamics and delay; a high bandwidth actuator is required.
3. $|Q|=1$ minimizes actuation effort; a large deviation from one requires actuators with large torque capacity.

Impedance Approach

So far the control approach proposed for emulating robot has been based on the premise that a perfect model of the manipulator and ideal source of joint torque, i.e. no actuator dynamics, are available. Therefore, the control system can trivially assign infinite stiffness to the manipulator thereby achieving dynamic decoupling of the simulator and the emulating robot systems which are in a closed-loop configuration. However, in practice, the motion control system of the emulating robot can only achieve finite bandwidth and stiffness and this scheme is susceptible to instability.

In accordance with the principles of the invention, there is described a µ synthesis based controller for shaping force response of a robot according to a desired response even with the presence of variation of the environment parameters (stiffness and damping). The performance is defined in terms of distance between the actual and desired force responses and also sensitivity to the force sensor noise, while the variation of the environment impedance enters as a perturbation. The $H_\infty$ controller achieves robust performance and contact stability.

FIG. 2 shows the concept of emulation of the space robot. Dynamics of the space robot is numerically simulated and a real-time simulator drives a robot prototype which performs contact task. The contact force and moment resulting from the interaction of the real robot end-effector and the environment are measured by a force plate and the signals are feedback into the space robot simulator, which in turn, affects the control commands. Let $v_s$ and $v_r$ denote the end-effector velocities corresponding to the space robot simulator, and the emulating robot, respectively. Then, the objective of control is $v_r$ tracks $v_s$ in free-space and also in contact phase.

A Linear Model of Robots Interacting with Environment

Manipulators are generally non-linear devices, but the system dynamics can be well captured by linear system about a certain position of the end-effector provided slow operation. In the sequel, the analysis and design of robot emulation are cast in the framework of multivariable control in frequency-domain. The input-output behavior or the system consisting of the space robot and its controller can be described by (see Appendix C for a detailed derivation)

$$v_s = [T_{vs} \ -Y_s] \begin{bmatrix} r \\ f_s \end{bmatrix} \quad (34)$$

where $v_s$ is the velocity of the robot end-effector, r is the hand controller velocity command, and $f_s$ is contact force. Transfer functions $T_{vs}$ and $Y_s$ represent velocity transmissivity and admittance of the space robot system—admittance is the inverse of impedance, i.e. $Y_s = Z_s^{-1}$. The mechanical impedance relating the force and the velocity at the point of contact describes the environment dynamics as $$f_s = Z_v v_s. \quad (35)$$

Figure 7:
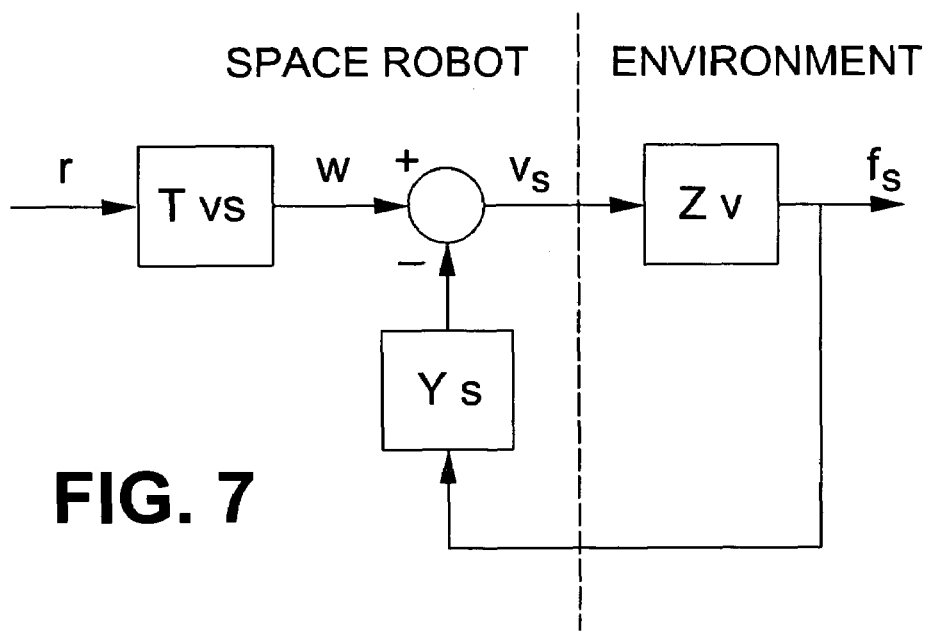
FIG. 7 is a linear model of a space robot.

FIG. 7 demonstrates the robot-environment interaction in a closed-loop configuration. The input-output representation of the closed-loop system is given by so-called force transmission function as $$\frac{f_s}{r} = T_{fs}, \text{ where } T_{fs} = Z_{cls}T_{vs}, \quad (36)$$

and $$Z_{cls} = (1 + Z_v Y_s)^{-1} Z_v$$

is the so-called closed-loop impedance of the robot, that amounts to equivalent of serial impedances of the robot and the environment.

Let's define exogenous signal $$w = T_{vs}r. \quad (37)$$

Then $$Z_{cls} = \frac{f_s}{w}.$$

Uncertainty Model of Environment

In essence, the contact dynamics emulation should be able to perform without incorporating a model of environment. However, the environment impedance enters into the system as a perturbation. Hence, in order to achieve an optimal performance, one need to characterize the impedance by an uncertainty model. The environment impedance can be adequately modelled by $$Z_e = diag\left\{(c_i s + k_i)\frac{1}{s}\right\}, \quad (38)$$

where $k$ and $c$ denote the stiffness and damping coefficients. Now assume $Z$ as a class of all impedances whose stiffness and damping coefficients are $k_i = \bar{k}_i + \Delta_{ki}$ and $c_i = \bar{c}_i + \Delta_{ci}$, where the signs and $\Delta$ denote the nominal value and uncertainty, respectively. $\Delta_{ki}$ and $\Delta_{ci}$ are bounded parametric uncertainties such that $|\Delta_{ki}| \leq \gamma_{ki}$ and $|\Delta_{ci}| \leq \gamma_{ci}$. Now the transfer function of the impedance can be expressed in terms of the parameters uncertainty as $$Z_v = \bar{Z}_v(I + \Delta_z)$$

where $\Delta_z$ belongs to the following uncertainty set $$\Delta_z := \left\{diag\left\{\frac{\Delta_{ci}s + \Delta_{ki}}{\bar{c}_i s + \bar{k}_i}\right\}, |\Delta_{ki}| \leq \gamma_{ki}, |\Delta_{ci}| \leq \gamma_{ci}\right\}.$$

It is evident from above that the uncertainty is bounded over all frequencies, i.e. $\Delta_z \in H_\infty$, which is an important requirement for robust control synthesis. Also, it is always possible to find a weighting function $W_z \in H_\infty$ such that the uncertainty is normalized less than one, i.e.

$$\Delta_z = W_z \tilde{\Delta}_z \text{ and } \|\tilde{\Delta}_z\|_\infty \leq 1.$$

For practical relevance, it is more convenient to express the uncertainty in terms of damping ratio $\zeta = c/k$, where $\zeta = \bar{\zeta} + \Delta_\zeta$ and $\bar{\zeta} = \bar{c}/\bar{k}$, i.e.

$$\Delta_z = \frac{\Delta_k}{\bar{k}} \frac{1 + \left(\zeta + \Delta_\zeta \frac{\bar{k}}{\Delta_k}\right)s}{1 + \bar{\zeta}s}$$

Let's assume the parameter variations be $$10^3 \leq k \leq 2 \times 10^6,$$
$$0.05 \leq \zeta \leq 0.2, \quad (39)$$

that is $\bar{k} = 10^6$ and $\bar{\zeta} = 0.125$. Hence $$\bar{Z}_v = \frac{0.125s + 1}{s} \times 10^6.$$

Figure 9:
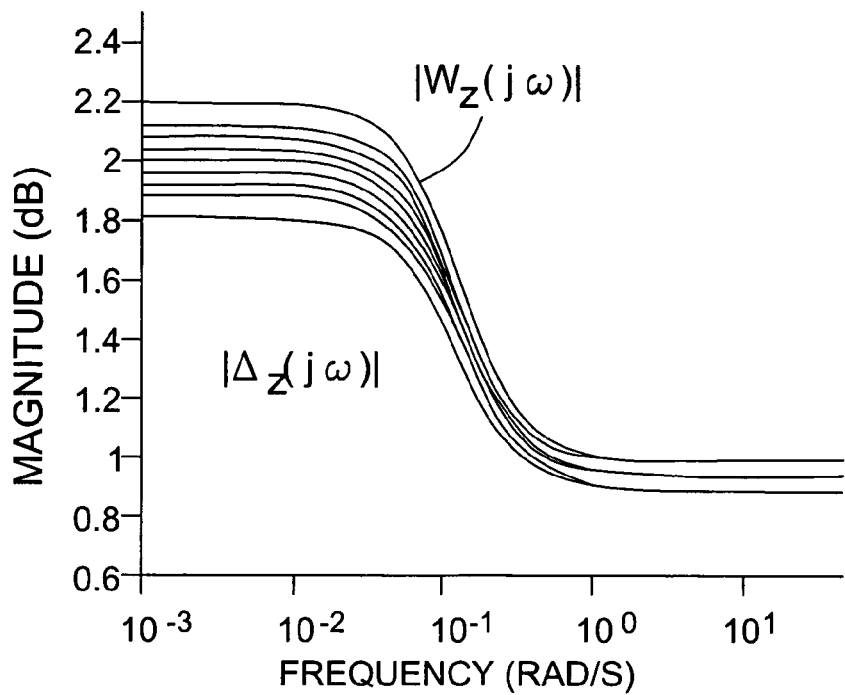
FIG. 9 shows the upper bound for the magnitude of the perturbation.

FIG. 9 are Bode plots of $\Delta_z(s)$ for the above parameter variation. It is clear that the magnitude of $$W_z(s) = \frac{0.99s + 0.27}{s + 0.13} \quad (40)$$

tightly bounds all of the variations in the uncertainty $\Delta_z$.

Robust Stability Analysis

The sensitivity function S(L) and complementary sensitivity function $$\Delta_z = W_z \tilde{\Delta}_z \text{ and } \|\tilde{\Delta}_z\|_\infty \leq 1.$$

For practical relevance, it is more convenient to express the uncertainty in terms of damping ratio $\zeta = c/k$, where $\zeta = \bar{\zeta} + \Delta_\zeta$ and $\bar{\zeta} = \bar{c}/\bar{k}$, i.e.

$$\Delta_z = \frac{\Delta_k}{\bar{k}} \frac{1 + \left(\zeta + \Delta_\zeta \frac{\bar{k}}{\Delta_k}\right)s}{1 + \bar{\zeta}s}$$

Let's assume the parameter variations be $$10^3 \leq k \leq 2 \times 10^6,$$
$$0.05 \leq \zeta \leq 0.2, \quad (39)$$

that is $\bar{k} = 10^6$ and $\bar{\zeta} = 0.125$. Hence $$\bar{Z}_v = \frac{0.125s + 1}{s} \times 10^6.$$

FIG. 9 are Bode plots of $\Delta_z(s)$ for the above parameter variation. It is clear that the magnitude of $$W_z(s) = \frac{0.99s + 0.27}{s + 0.13} \quad (40)$$

tightly bounds all of the variations in the uncertainty $\Delta_z$.

Robust Stability Analysis

The sensitivity function S(L) and complementary sensitivity function S(T) of closed-loop associated with open-loop function L are defined as $S(L) = [I+L]^{-1}$ and $T(L) = I - S(L)$, respectively.

The robot with admittance Y(s) is robust stable (RS) with all environment $Z_v \in Z$ if $$\bar{\sigma}(T)|W_z|<1 \text{ where } T=(1+\bar{Z}_v Y)^{-1}\bar{Z}_v Y.$$

With the application of small gain theorem, we can say $$RS \Leftrightarrow \bar{\sigma}(T\Delta_z)<1$$

$$\Leftrightarrow \bar{\sigma}(T)|W_z|\|\tilde{\Delta}_z\|<1$$

Emulating Robot System

A linear model representation of dynamics of the emulating robot system is given in FIG. 8A, where a real-time simulator capturing dynamics of the space robot in free-space issues end-effector motion commands to be tracked by the emulating robot. The motion tracking performance of the emulating robot controller is depicted by transfer function $T_{vr}$. The emulating robot admittance $Y_r$ is different from $Y_s$. Therefore, when the emulating robot establishes contact, the contact force is fed back to the simulator through filter F in order to compensate the difference. Now let's consider the combined systems of the simulator and the emulating robot as a whole, as illustrated in FIG. 8B. Then, the system IO can be described by $$v_r = [T_{vr}T_{vs} \quad -(Y_r+T_{vr}F)] \begin{bmatrix} r \\ f_r \end{bmatrix} \quad (41)$$

In the above $T_{ve}=T_{vr}T_{vs}$ and $Y_e=Y_r+T_{vr}F$ can be treated as equivalent velocity transmissivity and admittance of the entire emulating robot system. Similarly, the closed-loop impedance of the emulating system can be defined as $$Z_{cle} = (I+Z_v Y_e)^{-1} Z_v, \quad (42)$$

where $$Z_{cle} = \frac{f_r}{w}.$$

Now the control paradigm is: Given identical environment stiffness in both systems in FIGS. (7) and (8), find stabilizing feedback F such that the two systems are equivalent.

That is the contact forces $f_r$ and $f_s$ in response to velocity command r are close as much as possible. A trivial solution to this problem exists when $$T_{vr}=1 \text{ and } Y_r=0 \Rightarrow F=Y_s.$$

In that case the emulating robot is totally transparent so that as if the simulation robot directly interacts with the environment. Note that this result is consistent with the ideal control system described in the previous section. However, in practice, this ideal specification can not be met as real robots have finite bandwidth and stiffness. Indeed, in the course of many experiments it becomes apparent that choosing $F(s)=Y_s(s)$ often leads to instability of the entire system. In the following, we cast the problem of finding an adequate force feedback F(s) in a $H_\infty$ control synthesis.

Assume that the environment impedance belongs to a class of transfer functions, i.e. $Z_v \in Z$. Then, the control requirements can be specified as follows:

1. motion tracking, i.e. $v_r \to v_s$.
2. Matching force response of the emulating robot system with that of the target robot, i.e. min $\|e_f\| \ \forall Z_v \in Z$ where $e_f = f_r - f_s$ is error w.r.t. a command r.

2. Low sensitivity to the noise associated with force sensor.
3. Contact stability $\forall Z_v \in Z$.

Good tracking performance in free space doesn't guarantee $v_r$ tracks $v_s$ while the robot performs contact task. In the following we show that the second and the third requirements in the above are almost equivalent.

FIG. 8B shows the emulating system where the force sensor noise $f_{dis}$ enters as disturbance. Let's define $Z_{c/r}$ and $T_{fr}$ as the closed-loop impedance and force transmissivity associated with emulating robot analogously to equation (36). Then, the sensitivity function to the noise is $$T_{f_{dis}f_r}=S, \text{ where } S:=(1+T_{fr}F)^{-1} \quad (43)$$

is the sensitivity function of the closed-loop force feedback.

Control Design in the Frequency Domain

Given the emulating robot characterized by and admittance find the force feedback loop closed around the robot motion controller such that robot contact force response be to that of the target robot as closely as possible for a class of environment impedances. Besides the robot remains stable in the contact and the sensitivity of the output force with respect to the force plate noise is limited at will for all class of impedances.

The control design methodology in accordance with the principles of the invention is based on uncertainty representation and the performance specifications that are mentioned earlier. Let's $z_1$ and $z_2$ specify the exogenous output signals as $$z_1:=f_r-f_s \text{ and } z_2:=v_s',$$

and w be the exogenous input signal. Then, the aforementioned control requirements can be met by shaping the closed-loop sensitivity functions $T_{w,z_1}:=w \mapsto z_1$ and $T_{w,z_2}:=w \mapsto z_2$ so that $|T_{w,z_1}(j\omega)| \leq |W_1(j\omega)|$ and $|T_{w,z_2}(j\omega)| \leq |W_2(j\omega)|$ over all the environment impedances, where weighting functions $W_1$ and $W_2$ are specified based on desired performance. More specifically, the control problem can be specified as finding a controller F(s) such that for all $\tilde{\Delta}_z$ with $\|\tilde{\Delta}_z\|_\infty \leq 1$, the closed loop system remains stable and besides the following performance criterion holds $$\min_{F(s)} \left\| \begin{matrix} W_1 T_{w,z_1} (P, F, \tilde{\Delta}_z) \\ W_2 T_{w,z_2} (P, F, \tilde{\Delta}_z) \end{matrix} \right\|_\infty$$

The resulting controller will obviously ensure robust performance of the closed loop system against model uncertainty represented by $\tilde{\Delta}_z$. Note that in the above $T_{w,z_1}=Z_{c/e}-Z_{c/s}$ is the distance between the impedances and $T_{w,z_2}=S$ is the noise sensitivity of the emulating system.

Robust Stable Solution

Figure 10:
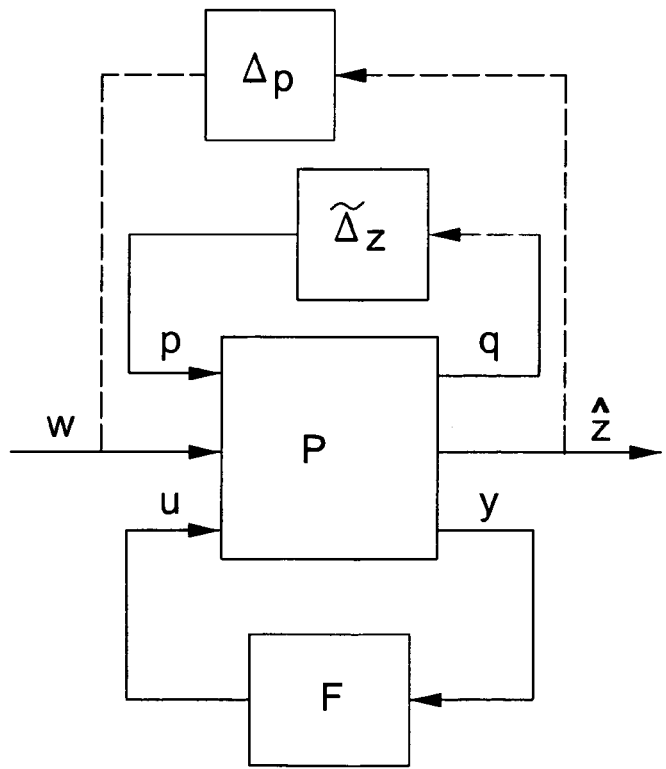
FIG. 10 is a block diagram of an LFT model for control synthesis.

A robust stable solution can be found that optimizes the performance for the nominal plant, while ensuring stability for all uncertainties $\Delta_z \in \Delta_z$. This problem can be formulated as a $\mu$-synthesis problem based on the uncertain model structure FIG. 10 presented in the Linear Fractional Transformation (LFT) form. The generalized plant with inputs p, w, and u and outputs q, $\hat{z}$, and y, where $\hat{z}_1=W_1 z_1$ and $\hat{z}_2=W_2 z_2$ and $$\hat{z}^T:=[\hat{z}_1^T \hat{z}_2^T], p^T:=[p_1^T p_2^T], q^T:=[q_1^T q_2^T].$$

Let the transfer function from $[p^T w^T u^T]^T \to [q^T \hat{z}^T y]^T$ be denoted by P partitioned as $$P := \begin{bmatrix} P_{11} & P_{12} & P_{13} \\ P_{21} & P_{22} & P_{23} \\ P_{31} & P_{32} & P_{33} \end{bmatrix}$$

where $$P_{11} := \begin{bmatrix} Q_r - 1 & 0 \\ 0 & Q_s - 1 \end{bmatrix} W_z, \quad P_{12} := \begin{bmatrix} \bar{Z}_{clr} T_{vr} \\ \bar{Z}_{cls} \end{bmatrix}, \quad P_{13} := \begin{bmatrix} Q_r T_{vr} \\ 0 \end{bmatrix},$$

$$P_{21} := W_1 \begin{bmatrix} \bar{Z}_{clr} - \bar{Z}_{cls} \\ 0 & 0 \end{bmatrix} W_z, \quad P_{22} := \begin{bmatrix} W_1(\bar{Z}_{clr} T_{vr} - \bar{Z}_{cls}) \\ -W_z \end{bmatrix}, \quad P_{23} := \begin{bmatrix} -W \bar{Z}_{clr} T_{vr} \\ W_2 \end{bmatrix},$$

$$P_{31} := [\bar{Z}_{clr} W_z \quad 0], \quad P_{32} : \bar{Z}_{clr} T_{vr}, \quad P_{33} := -\bar{Z}_{clr} T_{vr}.$$

In the above, $Q_r = \bar{Z}_v^{-1} \bar{Z}_{c/r}$ and $Q_s = \bar{Z}_v^{-1} \bar{Z}_{c/s}$, where the bar sign denotes the nominal quantities corresponding to nominal environment impedance $\bar{Z}_v$. It is worthwhile noting that replacing the impedances with the force transmissivity transfer functions has two folds: it reduces arithmetic operations for calculating the elements of P. This results in a reduced order system that facilitates control synthesis. Also, form a practical relevant, the new notation makes experimental identification easier. This is because one have access to input/output signals of $Z_v$ but not to those of $Y_r$.

The robustness and performance issues can be completely addressed by adding a fictitious uncertainty $\Delta_p$ through which feedback from output $\hat{z}$ to input w is established. Then, robust performance is achieved if the lower LFT $$M = F_1(P,F) = P_{11} + P_{12} F(I - P_{22} F)^{-1} P_{21}$$

is robust stable with respect to the structured perturbation $\Delta = \text{diag}\{\Delta_p, \tilde{\Delta}_z\}$. That is the structured singular value (SSV) has to be less than one, that is $$\mu_\Delta(M) = [\inf_\Delta \|\Delta\| |\det(I - M\Delta) = 0]^{-1} < 1.$$

Quantity $\mu(M)$ is the size of smallest perturbation $\Delta$ that can destabilize the closed-loop system. Therefore, the objective of the $\mu$-synthesis is to find a controller F(s) minimizing $\mu(M)$. $\mu(M)$ can be approximated by finding scale matrix D from the following $$\mu_\Delta(M) \leq \inf_{D \in \mathcal{D}} \bar{\sigma}(DMD^{-1}). \tag{44}$$

This problem, in general, is a hard to solve due to non-convexity of resulting feasibility problems. However, it can be solved numerically by the D-F iteration. Assuming that $\tilde{\Delta}_z = \text{diag}\{\delta_i\}$, we have $$\Delta := \{\text{diag}\{\delta_1, \ldots, \delta_n, \Delta_p\} : \delta_1, \ldots, \delta_n \in \mathbb{C}, \Delta_p \in \mathbb{C}^{n \times 2n}\}.$$

Define $\mathcal{D}$ to be the set of matrices D which commute with $\Delta$, i.e., satisfy $D\Delta = \Delta D$. That is $$\mathcal{D} := \{\text{diag}(D_1, d_2 I_{n \times n}) : D_1 \in \mathbb{C}^{n \times n}, d_2 \in \mathbb{C}\}.$$

Weighting Functions

The exogenous signal w is passed through filter $T_{vs}$ (see equation (37)). Moreover, to normalized the force error requires that it is filtered by $T_{fs}^{-1}$. This fact may suggest that magnitude of the weighting function should be selected as $$|W_1| = a_1 |T_{vs} \bar{T}_{fs}^{-1}|.$$

where $a_1$ is scaling coefficient.

Robust Performance Solution

Robust performance means that the performance objective is satisfied for all possible plants in the uncertainty set, even the worst case plant. Again the system can be presented in a LFT form with uncertain model structure corresponding diag$\{\tilde{\Delta}_z, \tilde{\Delta}_z, \Delta_p\}$. The model structure depends on the structure of the environment-impedance matrix.

Example 1: Let's assume the matrix of environment impedance be diagonal, i.e., $\tilde{\Delta}_z = \text{diag}\{\delta_i\}$. Then uncertainty is $$\Delta_1 := \{\text{diag}\{\delta_1 I_{2 \times 2}, \ldots, \delta_n I_{2 \times 2}, \Delta_p\} : \delta_1, \ldots, \delta_n \in \mathbb{C}, \Delta_p \in \mathbb{C}^{n \times 2n}\},$$

which specifies the scaling matrix D as $$D := \{\text{diag}(D_1, \ldots, D_n, I_{n \times n}) : D_1, \ldots, D_n \in \mathbb{C}^{2 \times 2}\}.$$

For the SISO case $D = \{\text{diag}(D_1, d_2 I), D_1 \in \mathbb{C}^{2 \times 2}, d_2 \in \mathbb{C}\}$. The $\mu$-synthesis problem with the above structure can be solved by using the Matlab $\mu$-Synthesis Toolbox.

Example 2: Let's assume that the environment impedance has no particular structure. Then, the uncertainty should have the following structure $$\Delta_2 := \{diag\{\tilde{\Delta}_z, \tilde{\Delta}_z, \Delta_p\} : \tilde{\Delta}_z \in C^{n \times n}, \Delta_p \in C^{n \times 2n}\}.$$

Then $$D_2 := \left\{ diag\left\{ \begin{bmatrix} d_{11} I_{n \times n} & d_{12} I_{n \times n} \\ d_{21} I_{n \times n} & d_{22} I_{n \times n} \end{bmatrix}, I_{n \times n} \right\} : d_{11}, d_{12}, d_{22} \in C, d_{21} = d_{12}^* \right\}.$$

The Matlab $\mu$-Synthesis $\mu$-synthesis cannot handle the above problem. However, the minimization problem (44) can be transformed into the following LMI (Linear Matrix Inequality) problem $$M^* X M - X \beta < 0,$$

where $X = D^* D > 0$, which can be solved by Matlab LMI Toolbox.

Experimental Validation

Consider a simple 1-dof (degree of freedom) robot case study to demonstrate the performance of the robot-emulation schemes with and without application of the constraints. It follows by implementation of the robot emulation on a 3-dof robot to demonstrate aspects of multi-axes case. In both cases, the objective is to change the dynamics of the actual robots, which are structurally rigid, in such a way that their dynamic responses resemble those of flexible-joint robots. In other words, the actual robot behave, either in contact phase or non-contact phase, as if there exist soft springs in their joints. Moreover, in order to create the zero-gravity condition in the laboratory environment, the gravitational forces are compensated by the controller.

Figure 11:
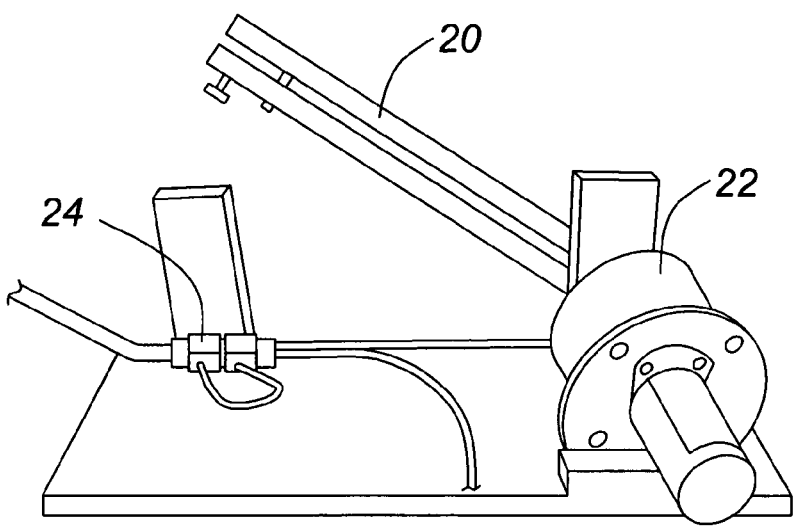
FIG. 11 illustrates the 1 d0f experiment setup.

FIG. 11 illustrates the 1-dof experimental setup consisting of a brushless electric motor (Inland Motor, model RBEH-02102-k02), an arm 20 mounted on the motor's shaft 22, and a load-cell 24 (Omega, model LCGD-100) installed at the work-site. The measurements of joint angle and tip acceleration are provided by a high resolution encoder (Precision Instrument, model R137) and an accelerometer (Endevco, model 7290A), respectively. The feedback loop runs at 1 kHz and the controller gains are chosen as $G_p=350$ and $G_v=40$. The accelerometer device outputs acceleration signal $a_{out}$ superimposed with gravitational acceleration, i.e.

$$a_{out} = \ddot{p}_r + \begin{bmatrix} R^T(q_r)g \\ 0 \end{bmatrix},$$

where matrix $R(q_r) \in R^{3 \times 3}$ represents orientation of manipulator endpoint with respect to the vertical line and $g=[0 0 - 9.81]^T$ is the gravity vector. Hence, the acceleration signals can be retrieved from (45) if the orientation matrix is given. For the single-axis case, we have:

$$\ddot{p}_r = a_{out} - 9.81 \cos(q_r).$$

The dynamics of a 1-dof flexible joint arm can be expressed by $$\begin{bmatrix} m_{s1}\ddot{q}_{s1} \\ m_{s2}\ddot{q}_{s2} \end{bmatrix} = \begin{bmatrix} k(q_{s2} - q_{s1}) + \zeta(\dot{q}_{s2} - \dot{q}_{s1}) \\ -k(q_{s2} - q_{s1}) - \zeta(\dot{q}_{s2} - \dot{q}_{s1}) - c_s\dot{q}_{s2} + \tau_s(t) \end{bmatrix}$$

where $m_{s1}=0.05$ kgm$^2$ and $m_{s2}=0.1$ kgm$^2$ are the link inertia and the drive inertia, l=0.3 m is the arm length, k=3.0 Nm/rad represents joint stiffness, $\zeta=0.1$ Nm.s/rad is damping at joint, and $\tau_s(t)$ is real-time control input of the simulated robot—in this particular illustration, the control law is comprised of the resolved-rate controller accompanied with a force-moment accommodation (FMA) loop.

The dynamics of the rigid joint robot is simply described by $$m_r\ddot{q}_r + c_r\dot{q}_r + w\cos(q_r) = \tau_r + fl$$

where $c_r=0.022$ Nm.s/rad represents joint viscous friction, and $m_r=0.05$ kgm$^2$ is the collective arm inertia, and w=0.5 Nm is the maximum gravity torque. Since $J_{s1}=J_r=1$, we have $q_{s1} \equiv q_r$. Hence the control law for the rigid robot which makes it behaves as a flexible joint robot can be expressed by $$\tau_r = c_r\dot{q}_r + w\cos(q_r) - fl + m_r m_{s1}^{-1}[\ddot{q}_{s1} + G_v(\dot{q}_r - \dot{q}_{s1}) + G_p(q_r - q_{s1})],$$

where $$\dot{\xi} = m_{s2}^{-1}[-k(\xi - q_r) - \zeta(\dot{\xi} - \dot{q}_r) + \tau_s(t)],$$

and $$\ddot{q}_{s1} = m_{s1}^{-1}[-k(\xi - q_r) + \zeta(\dot{\xi} - \dot{q}_r)].$$

Figure 12A:
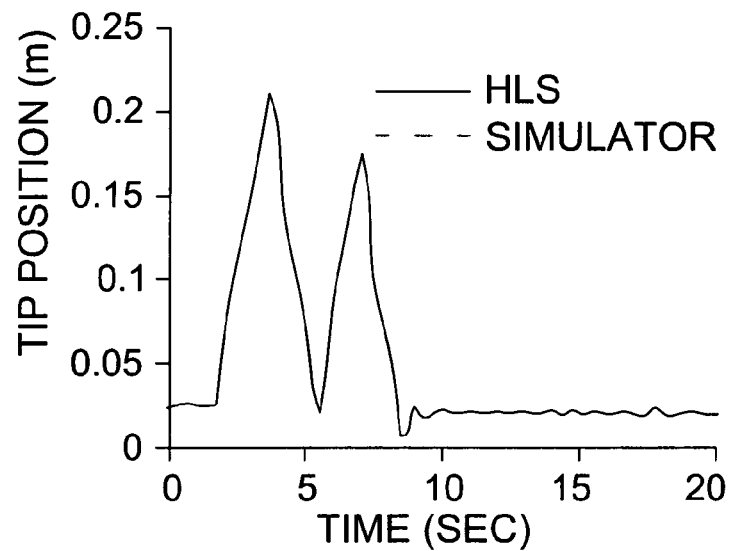
FIGS. 12A and B show the position (A) and velocity (B) of the tracking performance of the 1-dof robot emulator.
Figure 12B:
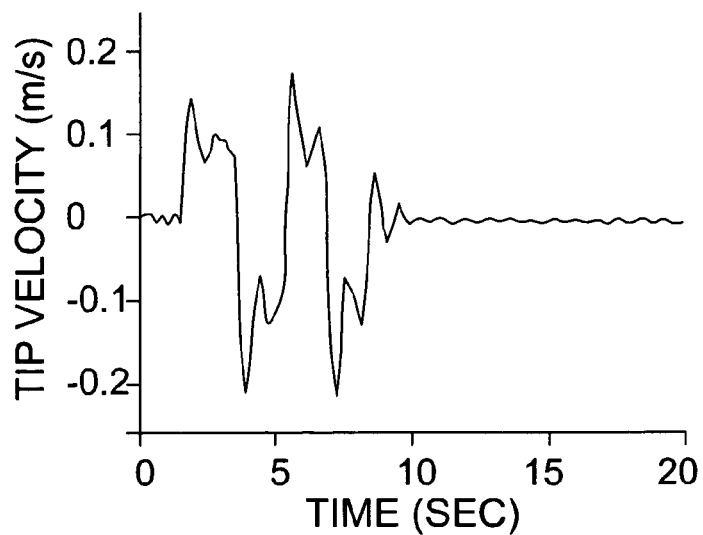
Figure 13E:
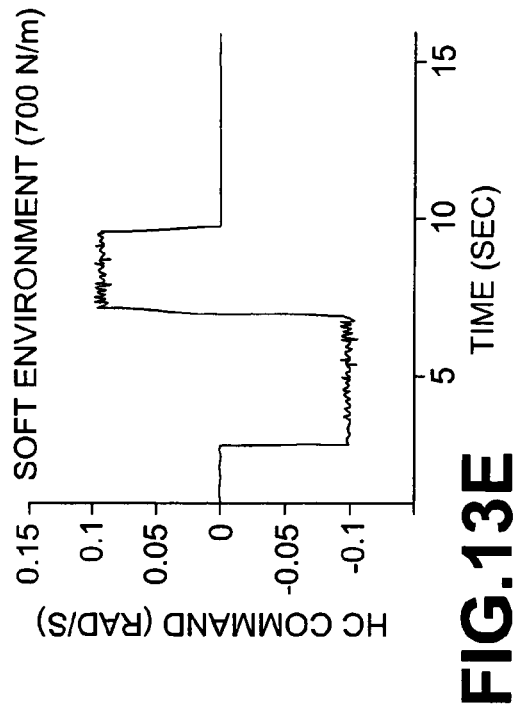
FIG. 13 shows the performance of the 1-dof robot-emulator in contact/non-contact transition.
Figure 13F:
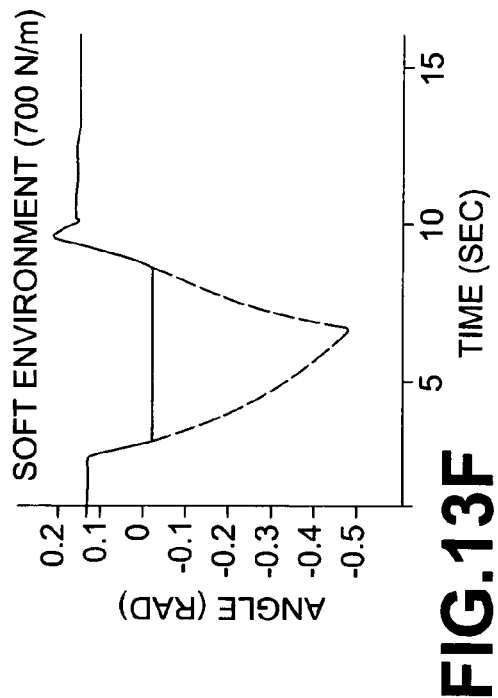
Figure 13G:
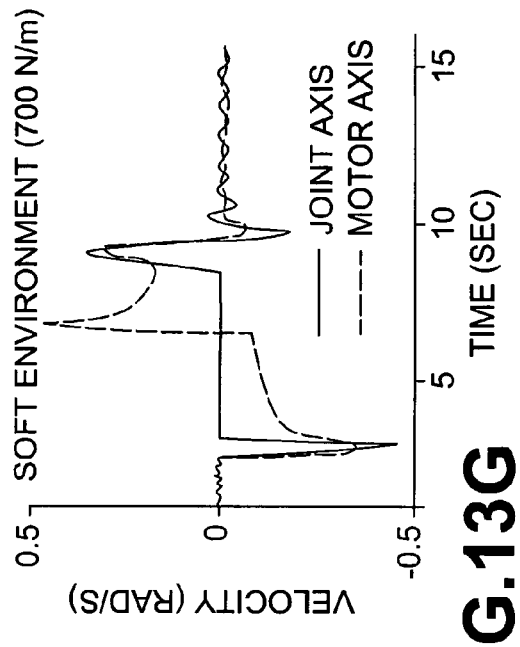
Figure 13H:
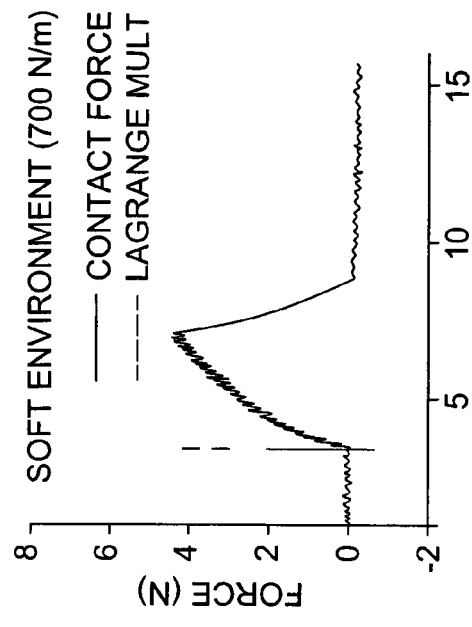
Figure 14A:
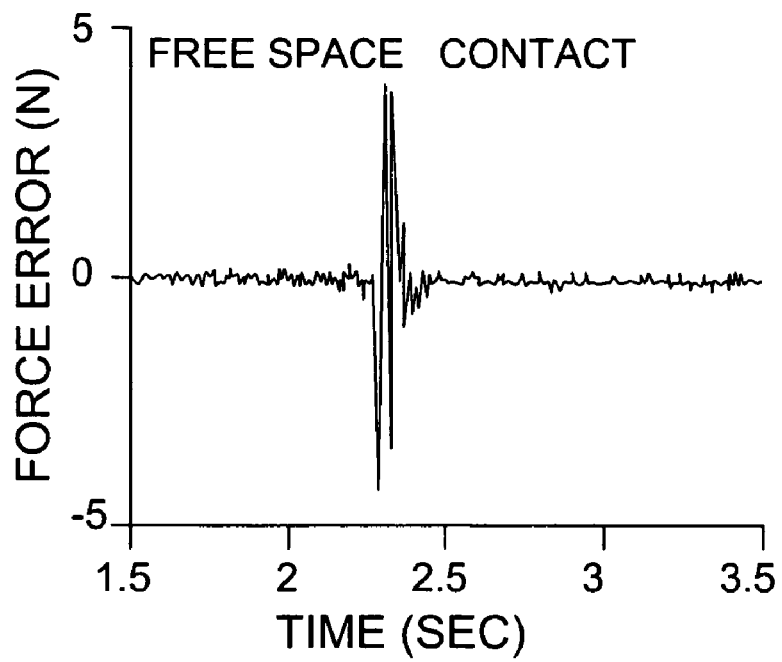
FIG. 14 shows the contact force error.
Figure 14B:
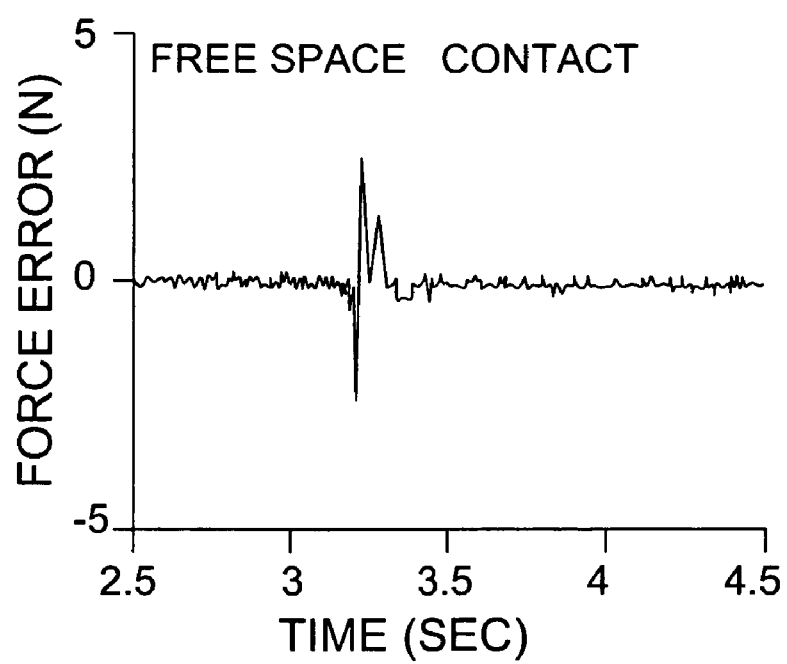
Figure 15B:
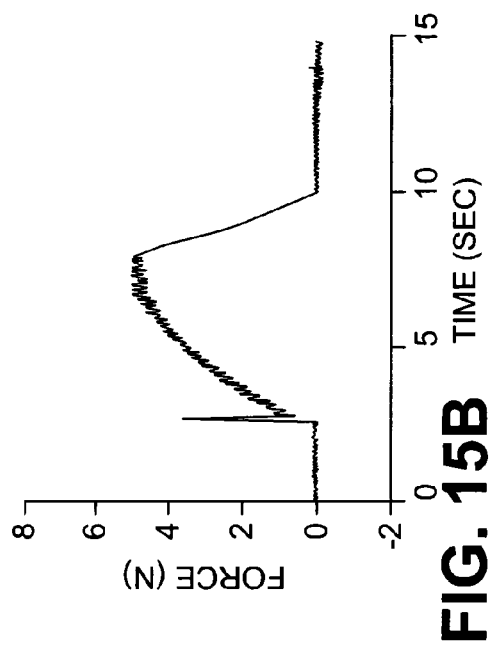
FIGS. 15A and 15B shows the contact test without applying the rheonomic constraint; contact force (A), and constraint error (B)
Figure 15D:
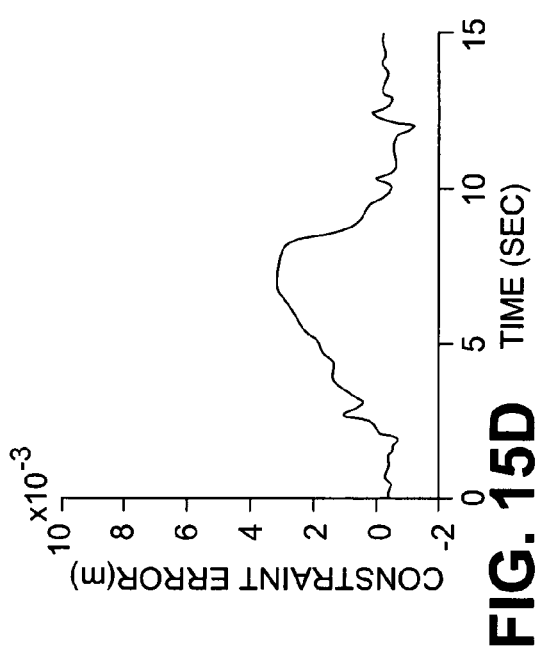
Figure 15A:
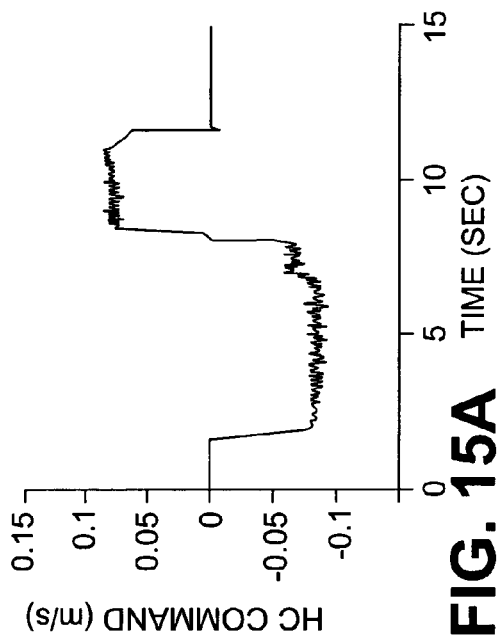
Figure 15C:
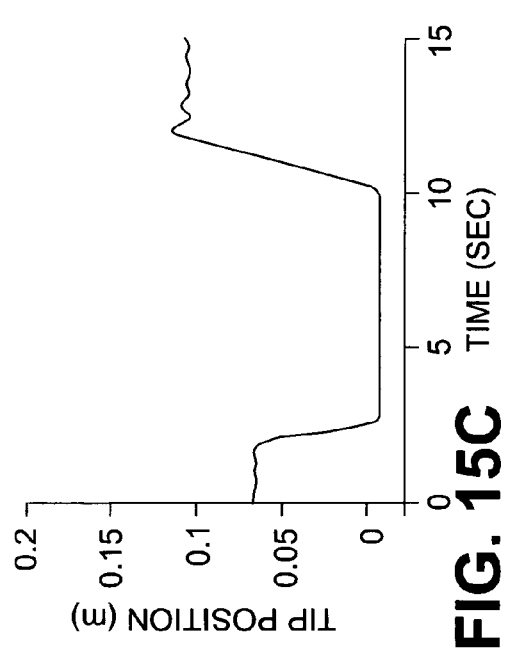

FIG. 12 demonstrates the performance of robot emulation in free space. A comparison of the endpoint position and velocity of the actual arm and those obtained from a pure simulation (dashed lines) demonstrates a good tracking performance. The performances in contact and transition phases are demonstrated in FIG. 13 for two cases: rigid environment and soft environment with stiffness of 700 N/m. FIGS. 13A and 13E show hand-controller (HC) input signals, which drive the simulated robot, while the remainder subplots illustrate the system responses. In order to make impulsive effect of contact/non-contact transition prominent, we choose a relatively high approaching velocity 0.1 m/s. Trajectories of joint angle and motor angle of the flexible-joint robot along with their velocities are depicted in FIGS. 13B, 13C, 13F, and 13G for a typical task with a sequence of non-contact, contact, and non-contact phases. A good match between the contact force and the Lagrange multiplier regardless of environment stiffness is demonstrated in FIGS. 13D and 13H. Trajectories of the force error $e_f = f_a - \lambda$ are zoomed in FIGS. 14A and 14B at the instant of transition from non-contact phase to contact phase for the two environment cases. The figures evidence that the emulating-robot performs with high fidelity when operating in either contact or free space phases while, up to a lesser extent in the transition phase, particularly when dealing with a stiff environment.

In the next experiment, the rigid environment case for performing the robot emulation without applying the constraints to the simulator is considered. Trajectories of the hand controller command, the tip position, the contact force, and the constraint error are illustrated in FIGS. 15A, 15C, 15B, 15D, respectively. The latter evidences that the constraint condition is grossly violated in the contact phase due to insufficient impedance of robot controller; even though the controller attempts to cancelled out the perturbation term $J_r^T f_a$. The implication of the constraint error is that the simulated robot virtually goes through the barrier which is physically rigid. In fact, the deviation of the constraint from zero in FIG. 15D with respect to the contact force in FIG. 15B amounts to a stiffness $1.6 \times 10^3$ N/m. This can be interpreted as the stiffness of a virtual environment seen by the simulated robot. That is the simulated robot behaves as if it interacts with the "soft" virtual environment, while the actual environment is rigid. This deficiency is avoided in the other emulation scheme by enforcing the constraints to the simulated robot. Thus, the pose of the simulated robot is always constrained by that of the physical barrier with which the actual robot interact.

Three-Dof testbed

FIG. 17 illustrates the 3-dof experimental setup. The robot joints are driven by geared motors RH-8-6006, RH-11-3001, and RH-14-6002 from Hi-T Drive accompanied by optical encoders. A multi-axes ATI force/moment sensor (gamma type) is installed at the robot wrist to measure contact force/moment. The emulating-robot is to emulate a flexible-joint robot with a joint compliance of $[10\ 5\ 2]^T$ Nm/rad and linkage inertia twice as much as its own. In this experiment, the feedback gains are $G_p=480$ and $G_v=45$, which corresponds to the bandwidth of 3.5 Hz. The flexible-joint robot is tele-operated using a hand-controller, and the robot control law comprises a resolved-rate controller accompanied by a force-moment accommodation loop similar to the previous one-dof case.

Figure 18A:
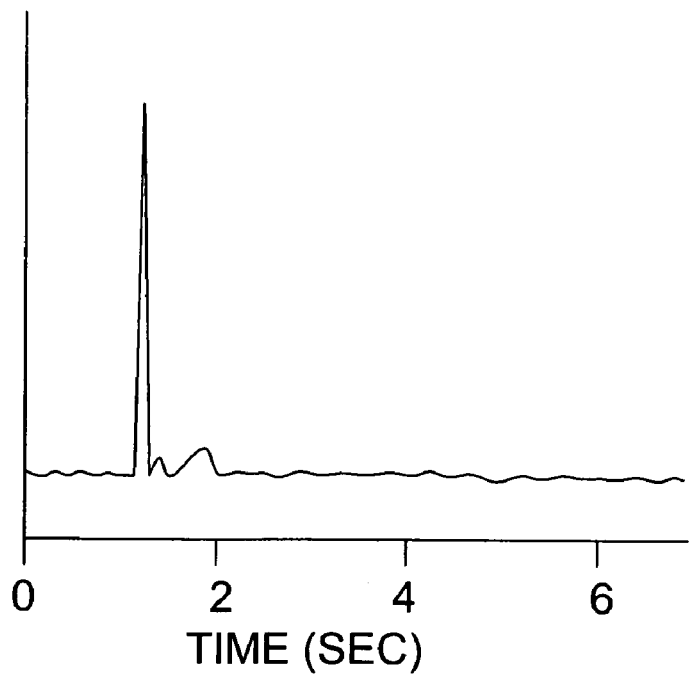
FIGS. 18A and B show the excitation impulse force (A), and the subsequent position response of the 3-dof robot (B)
Figure 18B:
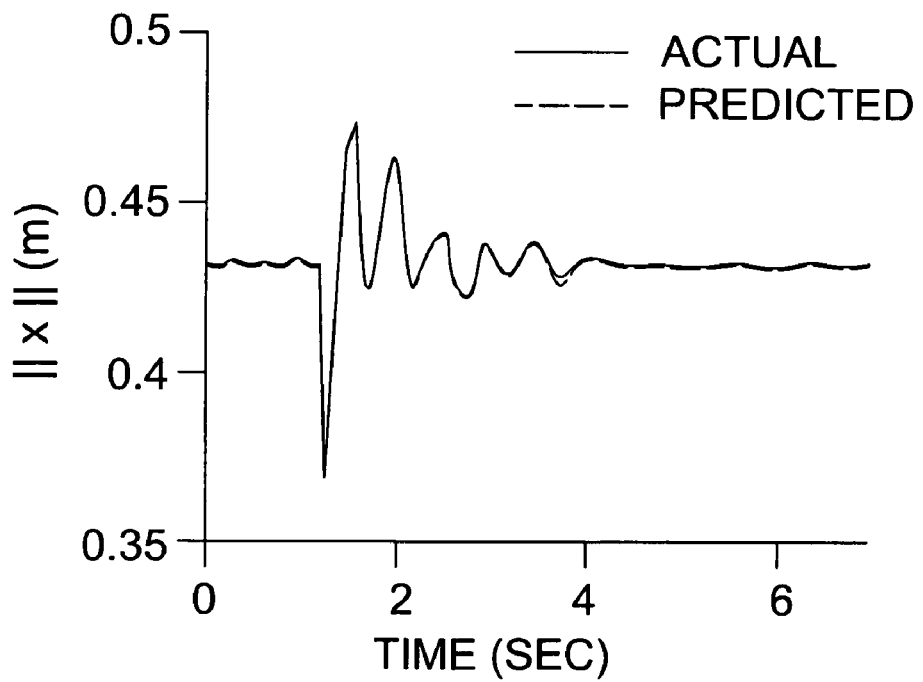

The first experiment involves testing performance of the robot emulating system in free space using an impulse response test. To this end, an excitation force is applied by a hammer to the robot end-effector; FIG. 18A illustrates the magnitude of the impulse force. The solid line in FIG. 18B illustrates the subsequent motion trajectory of the emulating robot end-effector, while the dashed line in the figure illustrates the predicted trajectory obtained from a pure simulation. A comparison of the plots evidences that the actual robot can accurately replicate the endpoint motion of the flexible robot in free space.

The performance of constrained motion of the robot is demonstrated qualitatively in FIG. 19 for a typical contact task. As can be seen from the pose trajectories in FIG. 19A, the robot starts moving in free space towards the barrier shown in FIG. 17. Having established contact with the barrier, the robot end-point can only move horizontally, because the vertical motion is constrained by the barrier; observe the flat segment of the y-axis component of the motion in FIG. 19A. Trajectories of the contact force signals, measured by the ATI sensor, and the Lagrange multiplier are depicted in FIGS. 19B and 19C, respectively. Note that the $f_y$ component of the contact force is produced by the elastic deformation of the environment, while $f_x$ component is mainly due to friction—the coefficient of the friction can be estimated from the ratio of the two force components that is about 0.2. The force/moment errors are illustrated in FIG. 19D. It is evident from the results that the emulating robot can produce high fidelity contact force/moment while performing the contact task. The emulating robot is also able to replicate motion of the flexible robot in a free space. However, the spikes in the plot of force error at time 3.5 sec. indicates that the emulating system exhibits less fidelity at the instance of transition from non-contact to contact phases.

Impedance-Matching

A hydraulic manipulator is used for emulation of the SPDM space robot. Although the control methodology is applicable to a multivariable case, we consider a decentralized controller assuming negligible cross-coupling among different channels of the robot impedance. In the sequel, all transfer functions are associated with the translational z-axis. The contact force/moment developed between the manipulator and environment is measured by a force plate installed on the ground.

In this test, the environment consists of a square plate which is mounted on the force plate by four poles. The stiffness of this environment is measured to be $\bar{k}=1.06\times 10^6$ N/m and $\bar{c}=1.1\times 10^5$ N.s/m that are close to the nominal values (39).

Figure 20A:
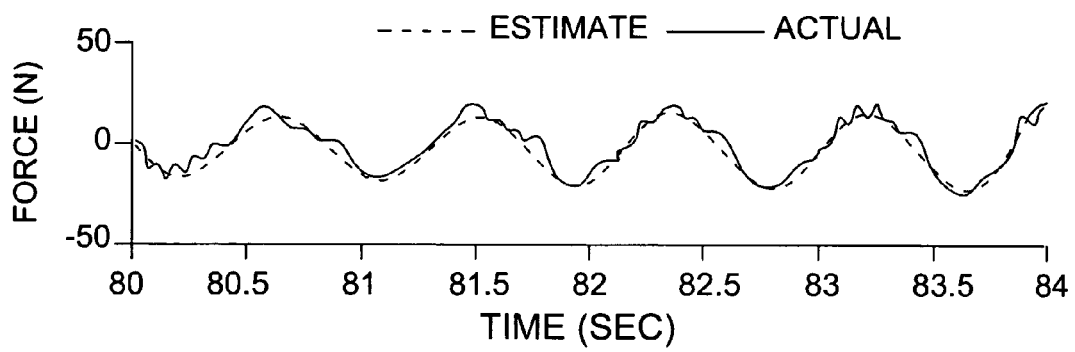
FIG. 20 shows comparisons of the actual and estimated force signals (fit: 76%)
Figure 20B:
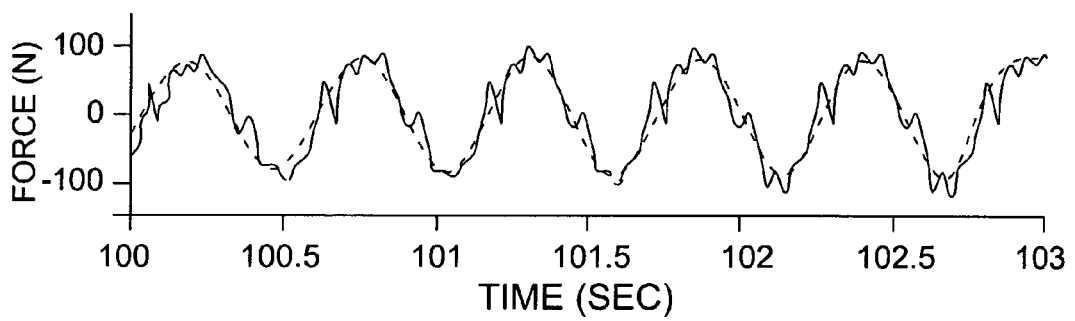
Figure 20C:
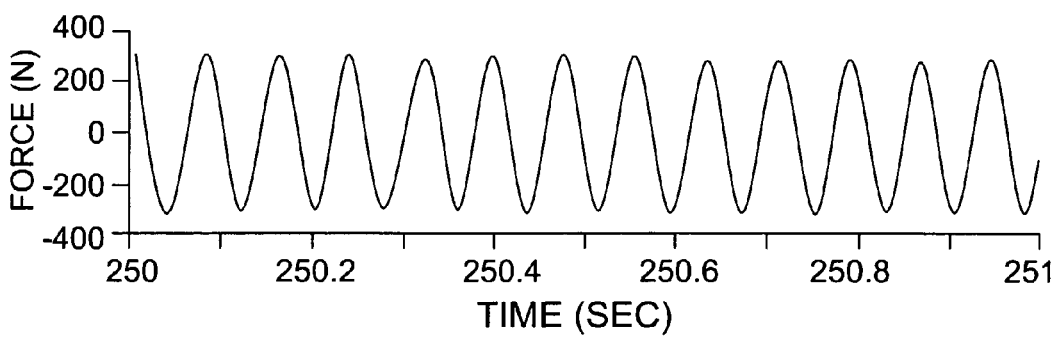
Figure 21:
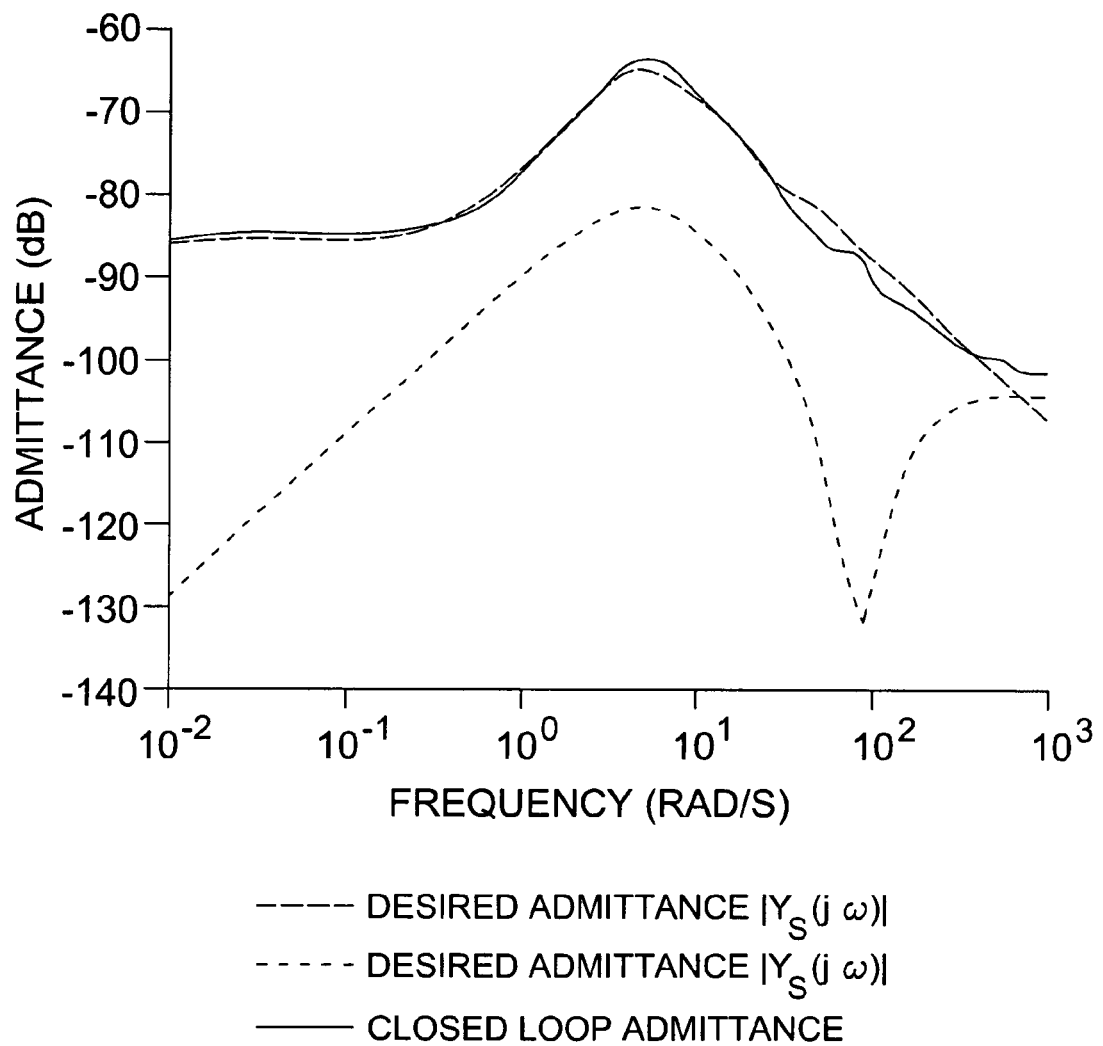
FIG. 21 shows the desired admittance, $|Y_s|$, versus open-loop, $|Y_r|$ and closed-loop admittances.
Figure 22:
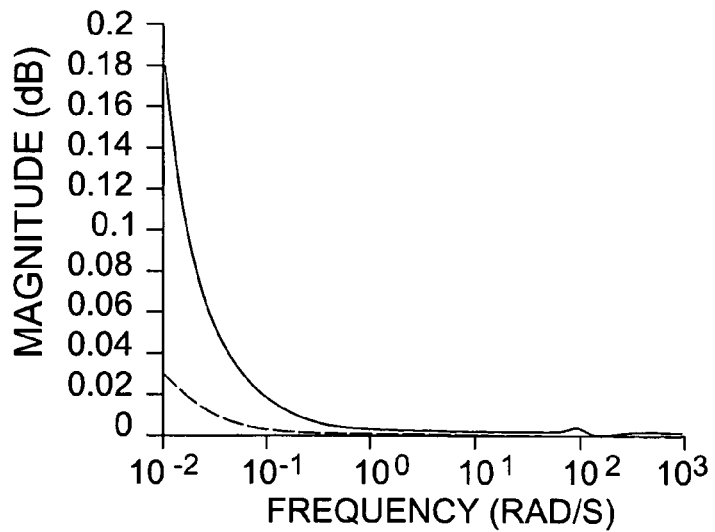
FIG. 22 shows the upper bound on $\mu$.

The design synthesis relies on the identification of the admittance of the emulating robot. The first step in identification process involves obtaining a sequence of input-output data. To this end, the robot grabs a peg and push the plate while a chirp disturbance signal is injected to the input. Matlab Identification toolbo were used to calculate the coefficients of a fixed rational transfer function to fit the data. Several parametric model were examined, and it turned out a 4th order system is sufficient to match the I/O behavior adequately. FIG. 20 illustrates some segments of the actual and estimated force signals at low and high frequencies; the estimated signal fits the actual data by 75%. The graph of the identified robot admittance is shown in FIG. 21 by the dashed-dotted line. It is evident from the plot that the robot exhibits a resonance at 15 Hz. The graph of the space robot admittance is also shown in the figure by the dashed line. The weighing functions are chosen as $$W_1(s) = \frac{3\times 10^{-7}s^3 - 3\times 10^{-4}s^2 + 0.1s + 0.14}{s^3 + 20s^2 + 140s + 210},$$

$$W_2(s) = \frac{s+0.8}{1.1s+0.009},$$

and $W_z(s)$ was previously derived in (40).

A μ controller was designed by taking into account the robust performance specifications for all possible variation of environment parameters, i.e. stiffness and damping, corresponding to (39). The solution was found by using Matlab Robust Control Toolbox based on the D-F iteration method. The μ upper bound obtained is less than 0.18, which shows the controller design effectively achieves the robust performance specified, in spite of the uncertain environment impedance.

Figure 23:
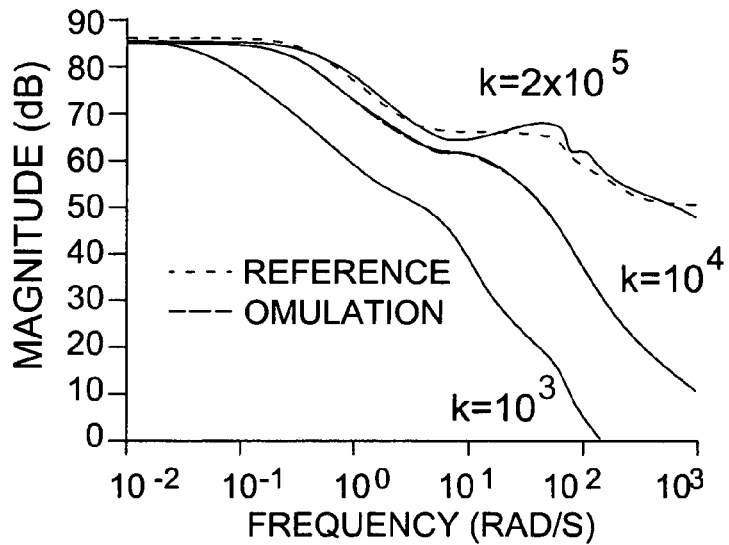
FIG. 23 shows the force transmissivity functions $|T_{r,fr}|$ (solid line) and $|T_{r,fs}|$ (dashed line) for various environment stiffness.
Figure 24:
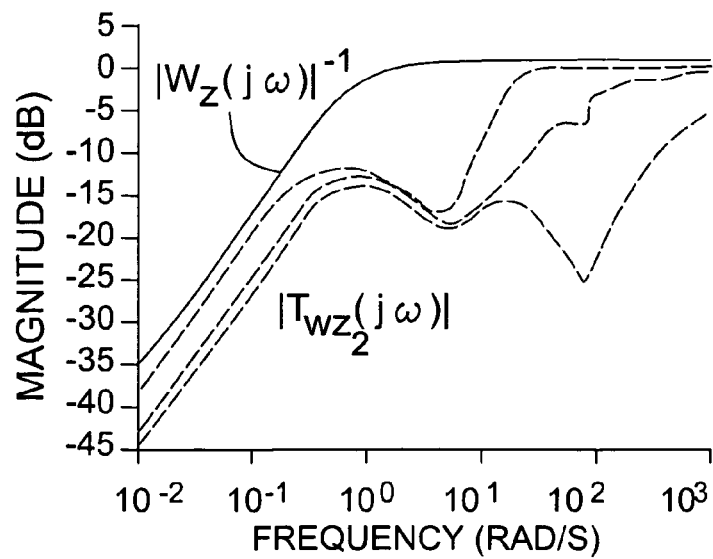
FIG. 24 shows the variation of sensitivity function $|T_{\omega,z2}(j\omega)|$.

The graph of $|Y_{rcl}|$ is depicted in FIG. 20 by solid line that demonstrates a good match with the desired admittance $|Y_s|$. A comparison of the force transfer functions of the emulation system (solid line) with that of the space robot (dashed-line) are given in FIG. 23 for various environment stiffness. The bode plots show a good match between the two systems. Also, the noise sensitivity functions for various environment stiffness are depicted in FIG. 24. It is evident form the figures that the magnitude of the sensitivity functions are well bounded by functions $|W_2(j\omega)|^{-1}$ which is the desired disturbance attenuation factor.

It is also possible to develop a linear model for the SPDM space robot as follows. The linearized model of a flexible-joint robot assuming slow operation in the neighborhood of some set point $q_0$ and $\dot{q}_0, \ddot{q}_0 = 0$ can be expressed by $$M_s\ddot{q}_s + C_s\dot{q}_s + K_sq_s = D\tau_s + J_s^T f_s \tag{47}$$

where $q_s^T = [q_{1s}^T \ q_{2s}^T]$, and $q_{1s}$ and $q_{2s}$ are the motor angles and joint angles, and $$D = \begin{bmatrix} I \\ 0 \end{bmatrix}, \quad J_s = [\, 0 \ \ J_{s2}\,].$$

In the above, $M(q_0)$ and $J_s(q_0)$ are assumed constant matrices, and $K_s$ is the stiffness matrix. A Force/Moment Accommodation (FMA) servo loop is closed around a resolved-rate motion controller. The joint rate servo includes a PI controller, i.e.

$$\tau_s = K_p(\dot{q}^* - \dot{q}_{1s}) + K_i\int(\dot{q}^* - \dot{q}_{1s})dt, \tag{48}$$

and $$\dot{q}^* = J_{s2}^+(r - \dot{x}_f), \tag{49}$$

where $J_{s2}^+$ generalized inverse of the Jacobian, and $\dot{x}_f$ is the filtered version of contract force $$\ddot{x}_f = -\sigma^{-1}\dot{x}_f + \sigma^{-1}Kf_s, \tag{50}$$

$K_f$ and σ are the FMA gain and time constant.

Let's assume u and y be the system input and output as $$u = \begin{bmatrix} r \\ f_s \end{bmatrix}, \quad y = v_s = J_s\dot{q}_s.$$

Also, assume $x^T = [x_1, \ldots, x_5]$ be the state vector, where $x_1 = q_s$, $x_2 = \dot{q}_s$, $x_3 = x_f$, $x_4 = \dot{x}_f$, and $\dot{x}_5 = r$. Then, substituting the control law (48) and (49) in (47) yields state-space representation of the system dynamics, i.e.

$$\dot{x} = Ax + Bu$$

$$y = Cx$$

where $$A = \begin{bmatrix} 0 & 1 & 0 & 0 & 0 \\ -M_s^{-1}(K_s + DK_i) & -M_s^{-1}(C_s + DK_p) & -M_s^{-1}DK_iJ_{s2}^+ & -M_s^{-1}DK_pJ_{s2}^+ & -M_{s2}^{-1}DK_iJ_{s2}^+ \\ 0 & 0 & 0 & 1 & 0 \\ 0 & 0 & 0 & \sigma^{-1} & 0 \\ 0 & 0 & 0 & 0 & 0 \end{bmatrix},$$

$$B = \begin{bmatrix} 0 & 0 \\ M_s^{-1}DK_pJ_{s2}^+ & M_s^{-1}J_s^T \\ 0 & 0 \\ 0 & \sigma^{-1}K_f \\ 1 & 0 \end{bmatrix}, \text{ and } C = [\,0 \; J_{s2} \; 0 \; 0 \; 0\,].$$

Finally, the multivariable transfer function of the system is obtained from the state-space model as $$[T_{vs} - Y_s] = C(sI - A)^{-1}B.$$

The invention permits the emulation of a target robot, say a space robot, operating in a complex environment by using an actual robot. Although the actual emulating-robot is not dynamically equivalent to the target robot, the former is controlled such that the dynamical similarity is achieved. The emulation scheme aims to replicate the dynamical behavior of the target robot interacting with environment interaction without dealing with a complex calculation of the contact dynamics. Based on the uncertain model structure and the performance specifications, a robust performance is achieved using μ controller.

We claim:

1. A system for replicating the behavior of a target robotic manipulator with respect to a payload and worksite, comprising: a real-time simulator capturing the dynamics of the target robot manipulator; a mock-up of said payload and worksite; and an emulating robotic manipulator for interacting with said payload and worksite; said emulating robotic manipulator being controlled by said real-time simulator in a control loop to replicate the dynamical behavior of said target robotic manipulator in its environment by matching the impedance of the emulating robotic manipulator with that of the target robotic manipulator.

2. A system as claimed in claim 1, wherein said control loop is a feedback loop.

3. A system as claimed in claim 2, comprising a sensor for measuring at least one of the contact force and moment resulting from the interactive of said emulating robotic manipulator with its environment, and wherein signals from said sensor are fed back to said real-time simulator.

4. A system as claimed in claim 1, wherein said emulating robotic manipulator is rigid and said emulating robotic manipulator is controlled by a non-linear controller.

5. A system as claimed in claim 1, wherein said emulating robotic manipulator is rigid or flexible, and said emulating robotic manipulator is controlled by a linear controller.

6. A system as claimed in claim 5, wherein said linear controller is a mu-synthesis controller.

7. A system as claimed in claim 1, wherein the impedance of said emulating robotic manipulator is matched to the impedance of said target robotic manipulator as simulated by said real-time simulator, which is in a closed-loop configuration.

8. A system as claimed in claim 1, wherein the endpoint pose of the simulated robot manipulator is constrained with that of the emulating robot by applying a rheonomic constraint to the real-time simulator.

9. A system as claimed in claim 1, further comprising a controller applies a specified transfer function.

10. A system as claimed in claim 9, wherein said controller is configured to: minimize the weighted distance between realized and specified force transfer functions; minimize force sensitivity; and maintain closed loop stability over a wide range of environmental parameters.

11. A system as claimed in claim 1, wherein said control loop is based on a non-linear approach and matches the non-linear dynamic responses, and said emulating robotic manipulator is flexible or rigid.

12. A system as claimed in claim 1, wherein the impedance of the robot can be captured by a linear model, and the control of the emulating robotic manipulator is effected in the frequency domain.

13. A system as claimed in claim 12, wherein the impedance of the emulating robot is measured using spectral analysis.

14. A method of replicating the behavior of a target robotic manipulator in its environment using an emulating robotic manipulator, comprising: applying a motion control law to the emulating robotic manipulator with sufficient bandwidth to allow adequate maneuvering in free space; obtaining the impedance of the target robotic manipulator; obtaining experimentally the open-loop admittance of the emulating robotic manipulator; and matching the impedance of the target robotic manipulator and emulating robotic manipulator.

15. A method as claimed in claim 14, wherein the emulating robot is rigid, and the emulation is based on a non-linear model.

16. A method as claimed in claim 15, wherein the emulating robotic manipulator is assumed to be rigid or non-rigid, and the impedance of the robotic manipulator is captured using a linear model.

17. A method as claimed in claim 16, wherein said linear model is based on mu synthesis.

18. A method as claimed in claim 16, wherein control is effect in the frequency domain.

19. A method as claimed in claim 18, wherein the impedance of the emulating robotic manipulator is captured by spectral analysis.

20. A method as claimed in claim 14, further comprising computing a transfer function to match the input/output behavior of the emulating robotic manipulator.

21. A method as claimed in claim 14, further comprising: specifying a range of variation for stiffness and damping of the environment; building a parametric uncertainty model for the environment; and building a linear fractional transformation model based on the performance specification and said uncertainty model.

22. A method as claimed in claim 14, wherein the impedance of the target robotic manipulator is obtained for a sequence of input/output data obtained by excitation of the emulating robotic manipulator in contact with its environment.

23. A method for replicating the behavior of a target robotic manipulator with respect to a payload and worksite, comprising: providing a mock-up of payload and worksite; providing an emulating robotic manipulator which emulates the performance of the target robotic manipulator while interacting with said mock-up of the payload and worksite; and controlling said emulating robotic manipulator with a real-time simulator to maintain an endpoint pose of the emulating robotic simulator coincident with that of the target robotic simulator by applying a rheonomic constraint to the simulator.

24. A method as claimed in claim 23, wherein the dynamical behavior of said target robotic manipulator in its environment is emulated by matching the impedance of the emulating robotic manipulator with that of the target robotic manipulator.

25. A force feedback controller for an emulating robotic manipulator of a target robot, wherein, said force feedback controller is configured to:
  (i) build a parametric uncertainty model based on the range of variation on the stiffness and damping values in the environment;
  (ii) determine the open-loop frequency response of the emulating robot manipulator from a sequence of input-output data obtained by excitation of the emulating robotic manipulator in contact with the environment;
  (iii) compute the coefficient of a fixed transfer function to match the observed input/output behavior; and
  (vi) build a linear fractional transformation model based on a performance specification and the uncertainty model to achieve desired impedance and ensure contact stability.

26. A controller as claimed in claim 25, wherein said controller is a mu-synthesis based controller.

* * * * *